US006976846B2

(12) United States Patent
Dupont et al.

(10) Patent No.: US 6,976,846 B2
(45) Date of Patent: Dec. 20, 2005

(54) TELECOMMUNICATIONS VIRTUAL SIMULATOR

(75) Inventors: Anne Dupont, Englewood, CO (US); Brian Koldyke, Highlands Ranch, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 327 days.

(21) Appl. No.: 10/142,394

(22) Filed: May 8, 2002

(65) Prior Publication Data

US 2003/0215779 A1 Nov. 20, 2003

(51) Int. Cl.7 .............................................. G09B 19/00
(52) U.S. Cl. .................. 434/219; 434/224; 434/307 R; 434/365; 345/419
(58) Field of Search ................................ 434/118, 219, 434/224, 236, 307 R, 308, 365; 345/8, 156, 168, 419, 420, 805, 854; 348/39; 700/182; 702/150; 703/1, 6; 382/128; 318/568.17

(56) References Cited

U.S. PATENT DOCUMENTS

| | | | | |
|---|---|---|---|---|
| 5,130,794 A | * | 7/1992 | Ritchey | 348/39 |
| 5,320,538 A | * | 6/1994 | Baum | 434/307 R |
| 5,495,576 A | * | 2/1996 | Ritchey | 345/420 |
| 5,590,062 A | * | 12/1996 | Nagamitsu et al. | 703/6 |
| 5,631,973 A | * | 5/1997 | Green | 382/128 |
| 5,807,114 A | * | 9/1998 | Hodges et al. | 434/236 |
| 5,844,392 A | * | 12/1998 | Peurach et al. | 318/568.17 |
| 5,850,352 A | * | 12/1998 | Moezzi et al. | 345/419 |
| 6,094,625 A | * | 7/2000 | Ralston | 702/150 |
| 6,219,045 B1 | | 4/2001 | Leahy et al. | |
| 6,388,657 B1 | * | 5/2002 | Natoli | 345/168 |
| 6,580,441 B2 | * | 6/2003 | Schileru-Key | 345/805 |
| 6,600,502 B1 | * | 7/2003 | Brewster, Jr. | 345/854 |
| 2002/0044104 A1 | * | 4/2002 | Friedrich et al. | 345/8 |
| 2002/0101400 A1 | * | 8/2002 | Stewart et al. | 345/156 |
| 2002/0107674 A1 | * | 8/2002 | Bascle et al. | 703/1 |
| 2002/0133264 A1 | * | 9/2002 | Maiteh et al. | 700/182 |

OTHER PUBLICATIONS

"Virtual Environment Display System" by Fisher et al, ACM 1986 Workshop on Interactive 3D Graphics Oct. 23–24, Chapel Hill, North Carolina, 12 pages.*
"Interactive Simulation and Training" by Division, 1994, 4 pages.*

(Continued)

Primary Examiner—Joe H. Cheng
(74) Attorney, Agent, or Firm—Hogan & Hartson LLP

(57) ABSTRACT

A method and system for simulation training of one or more persons in the installation and/or repair of telecommunications equipment. The method includes presenting a plurality of scenarios associated with the installation and/or repair of telecommunications equipment to a user viewing a display, providing predetermined desired user inputs responsive to the presented plurality of scenarios, and providing a user input device for the user to transmit user inputs to the computer for responding to the plurality of scenarios. The user inputs represent actions by a user controllable virtual person representing the user to perform a series of simulated person interactions and simulated physical tasks associated with telecommunications equipment installation. The user inputs responsive to the plurality of scenarios are received and stored. The user inputs responsive to the plurality of scenarios are compared with the desired user inputs, and subsequent possible simulated person interactions and simulated physical tasks presented to the user are partially dependent on the previous user inputs.

15 Claims, 19 Drawing Sheets

OTHER PUBLICATIONS

"Insights to Discovery" by Fakespace, 1995, 4 pages.*

J. Markoff, "The Internet, in Three Dimensions; A New Language is Adding Depth to the Flat Computer Screen", The New York Times, Nov. 25, 1996, Late Edition, 3 pgs.

D. Sorid, "Jack is Put Through the Wringer, So You Won't Be", The New York Times, May 11, 2000, Late Edition, 4 pgs.

"Virtual reality shows trainees the way", Financial Post DataGroup, May 15, 2000 National Ed., 2 pgs.

"Worlds.com Reports Revenue For First Quarter 2000", Business Wire, May 15, 2000, 3 pgs.

F. Lafferty, "Twenty Questions: 'I've Presided Over the Birth of Something, I Don't Want to Preside Over its Death", Newspaper Publishing PLC, May 17, 2000, 4 pgs.

R. Dwek, "Virtual persona' website launches; Community site to link users with common interests, enabling brands to target specific markets", New Media, p. 22, May 18, 2000.

"Companies & Finance: UK: Boo ends with a bang as the money runs out", Companies & Finance: UK; p. 28, May 18, 2000.

NGN eLearning Prototype, Accenture, product information, Jun. 25, 2001, 2 pgs.

* cited by examiner

FIG. 6

TELECOMMUNICATIONS VIRTUAL SIMULATOR

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to data processing systems, and more particularly, to a method and system for interactively training students to perform selected tasks associated with the installation and/or repair of telecommunications equipment.

2. Description of the Related Art

Current training methods for installation and or repair of telecommunications equipment explain the processes involved either through printed training manuals, oral lectures, or recorded videos. These training tools are static and do not vary their presentation according to the characteristics or input of a user. As a result, a user of such training tools is unable to benefit from interactively learning the process of installation and repair of telecommunications equipment.

Generally, the more interactive a training tool is the more benefit it provides the user. Interactive training regimes reinforce the concepts and skills that are being taught, and can specifically target critical areas of training. Additionally, virtual reality interactive techniques allows the user to become immersed in the training by utilizing physical movement in a virtual world similar to that which will be experienced by the user during real world installation and repair of telecommunications equipment.

However, conventional training tools fail to allow a user to interact with persons and equipment in a manner that is analogous to the interactions a user would experience when actually installing or repairing telecommunications equipment. The conventional training tools fail to provide feedback and remediation specific to the user's weaknesses. In particular, conventional training tools do not present to a user a series of scenarios specific to the installation and/or repair of telecommunications equipment.

Thus, there has been a need for methods and systems that address these and other problems and provides more meaningful instruction on the repair and installation of telecommunications equipment.

SUMMARY OF THE INVENTION

An embodiment of the invention presents a method for simulation training of one or more persons in the installation and/or repair of telecommunications equipment. The method includes presenting a plurality of scenarios associated with the installation and/or repair of telecommunications equipment to a user viewing a display, providing predetermined desired user inputs responsive to the presented plurality of scenarios, and providing a user input means for the user to transmit user inputs to the computer for responding to the plurality of scenarios. The user inputs represent actions by a user controllable virtual person representing the user to perform a series of simulated person interactions and simulated physical tasks associated with telecommunications equipment installation. The user inputs responsive to the plurality of scenarios are received and stored. The user inputs responsive to the plurality of scenarios are compared with the desired user inputs, and subsequent possible simulated person interactions and simulated physical tasks presented to the user are partially dependent on the previous user inputs.

An embodiment of the invention presents a method for providing simulation training of one or more persons in the installation and/or repair of telecommunications equipment. The method comprises providing a computer readable storage medium encoded with computer readable code that corresponds to a plurality of scenarios associated with the installation and/or repair of telecommunications equipment. Each scenario includes computer code that can instruct a computer system to present a plurality of images to a user viewing a display, and each scenario includes computer code that can receive responsive user inputs to the plurality of images and compare the responsive user inputs with predetermined desired user inputs.

An embodiment of the invention presents a computer system for simulation training of one or more persons in the installation and/or repair of telecommunications equipment comprising. The system comprises a memory means for storing a plurality images associated with the installation and/or repair of telecommunications equipment, a display means for displaying to a user a plurality of scenarios associated with the simulated installation and or repair of telecommunications equipment, and an input means for providing a user input means for the user to transmit user inputs to the computer for responding to the plurality of scenarios. The user inputs represent actions by a user controllable virtual person representing the user to perform a series of simulated person interactions and physical tasks associated with telecommunications equipment installation. The system further comprises a processor means for comparing the user inputs with the desired user inputs, wherein subsequent possible simulated person interactions and simulated physical tasks presented to the user are partially dependent on the previous user inputs.

An embodiment of the invention presents an apparatus for providing simulation training of one or more persons in the installation and/or repair of telecommunications equipment. The apparatus comprises a computer readable storage medium encoded with computer readable code that corresponds to a plurality of scenarios associated with the installation and/or repair of telecommunications equipment. Each scenario includes computer code that can instruct a computer system to present a plurality of images to a user viewing a display, and each scenario includes computer code that can receive responsive user inputs to the plurality of images and compare the responsive user inputs with predetermined desired user inputs.

These and other features and advantages of the invention will be better understood from the following detailed description of a presently preferred embodiment of the invention in conjunction with the appended drawings.

BRIEF DESCRIPTION OF THE DRAWINGS

FIG. 6 is a further screen shot illustrating the Virtual Business Process tour.

DETAILED DESCRIPTION OF THE PREFERRED EMBODIMENT

Figure 1:
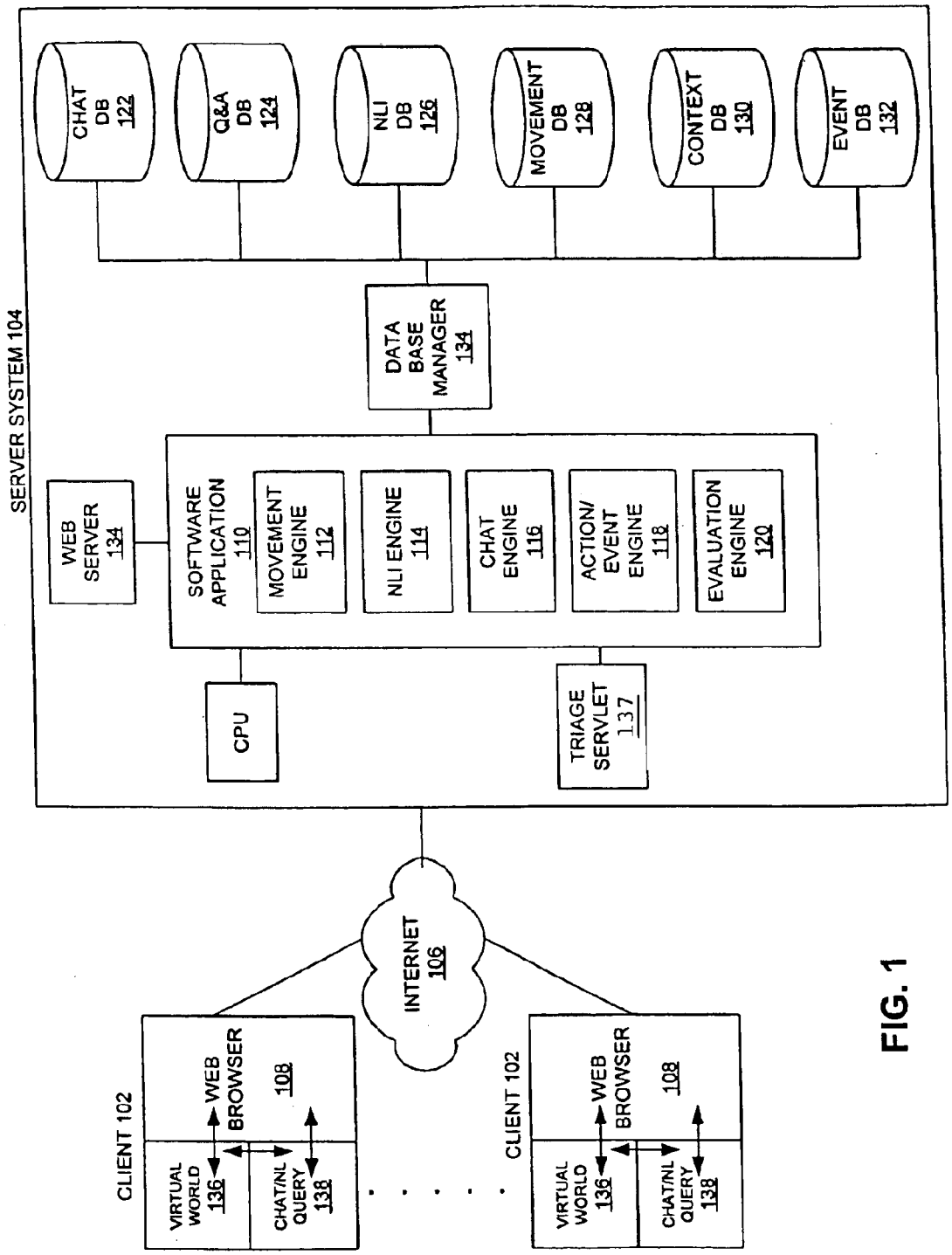
FIG. 1 shows an architecture of a presently preferred embodiment of the invention.

The present invention encompasses methods and related systems for training users in the installation and/or repair of telecommunications equipment. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. For example, other training scenarios than those described in the preferred embodiment may be presented to a user. Thus, the present invention is not intended to be limited to the embodiment shown, but is to be accorded the widest scope consistent with the principles and features disclosed herein.

This invention provides an interactive and dynamic telecommunications installation or repair training simulation, which reinforces training instruction by allowing a user to interact with associated multiple virtual reality scenarios (hereinafter also referred to as "worlds", as termed by the inventors). Each world is a scenario that a user is likely to encounter in a real world telecommunications installation or repair. The virtual reality scenario is also accompanied by a natural language/chat interface in which the user can interact with characters in the virtual reality using text or ask questions if the user requires help. The virtual simulator responds to user input and allows a user to practice operations necessary to achieve desired actions within each world. Therefore the training simulation of the present invention provides a useful and interactive training function focussing on the scenarios that the user is likely to perform in, rather than passive instruction. The user controls the operation of the training simulation via actions in the virtual world and communication via the natural language/chart interface. Each of the worlds is associated with previous and future worlds. User actions, omissions, and interactions in each world carry over into the next world. The present invention dynamically alters each world and the user's potential options in such world.

The training simulation simulates real-world situations a user is likely to encounter in a telecommunications installation or repair. The training simulation seeks to develop skills appropriate for a technician involved in the installation or repair of telecommunications equipment. These skills may be either technical or involve standardized business procedures. The training simulation is organized according to the major worlds a trainee is likely to encounter in the telecommunications equipment repair and installation industry. Each world is a scenario comprising a series of related images that requires a mastery of a skill necessary in the installation or repair of telecommunications equipment. Different worlds have different tasks that a user needs to learn. For example, a given world may be designed to train the user on certain items of equipment while another world may be designed to train the user on a given standardized business procedure. The worlds directly reflect the primary objectives of the training simulation and additional secondary objectives needed to achieve them. Some worlds may be identified and predetermined as essential; others simply reflect typical, but non-essential scenarios. During the training simulation, the user navigates within each world, and can move forward, sideward, or turn around.

One example problem or task that the user may be trained to complete is to install DSL service and configure a virtual private network at a customer site. In this example, there are five worlds that the user must complete: (1) the "garage" (2) the lobby of a customer high rise (3) the inside terminal (IT) room, (4) the customer suite, and (5) the communications equipment room. As part of the training simulation the user will be required to progress through all of the worlds, and interact with virtual individuals within the worlds and perform required tasks appropriately.

The garage world is where a telecommunications technician is based. The technician's supervisor is in the garage world as well as peer technicians, a computer that the technicians receives work through, and a printer that the technician can print jobs out on. Also within the garage world is a supply room where the technician selects the right set of tools and equipment to complete the tasks for that day. The purpose of the lobby world is for the user to learn how to interact with the building lobby security guard in order to obtain access to both the inside terminal (IT) room and the customer suite. The inside terminal room is typically the basement area of a high rise building in which all the telecommunications equipment from the street enters into a high rise building. The purpose of the IT room world is for the user to simulate performing a punch-down. The purpose of the customer suite world is for the user to learn how to interact with the receptionist at the customer suite in order to gain access to the customer suite equipment room. The equipment room is the space in which the telephone service provided by your company meets the customers and equipment which provides the networking activity to the end users offices, cubicles, laptops, etc. The purpose of the communications equipment room world is for the user to learn how to complete the DSL installation process by connecting a modem to the router. The worlds are discussed in further detail below.

The user completes a series of interpersonal as well as technical activities within each world. Technical activities can include installing a new piece of equipment, configuring equipment, and testing systems and components. Utilizing the virtual worlds of the present invention to simulate the exact same type of testing and components as a technician would perform out in the field, the present invention significantly reduces the cost and expenses associated with training a technician. In addition, the present invention results in improved quality of training, resulting in better productivity and fewer rejection rates for new technicians.

In a current embodiment of the invention, the training simulation further allows a user to submit questions about aspects of the training simulation. These questions may be submitted in a natural language format. A further embodiment of the invention allows the user to chat with an instructor or other trainees. In a current embodiment of the invention, in addition to virtual reality elements, multimedia elements are utilized as part of the training simulation. At select times during the simulation, a video presentation may appear in which a technician comments on the user's actions and/or provides instructions to the user.

The training simulation multimedia elements are developed using a variety of video technologies. For example, the training simulation video display, i.e., the video displayed in a pop up media window is developed from recording a technician speaking. Due to the potential wide variations of systems that will be accessing the training simulation and the varying speeds of Internet connections from user to user, the multimedia video elements may be saved in several formats and displayed with a streaming or progressive download technology, such as Windows™ Media Player or Real Player™. Prior to accessing the system, a user may be required to select a preferred video streaming, or other download format, and download speed.

FIG. 1 illustrates the basic components of a presently preferred embodiment of a system that operates in accordance with the present invention. The system includes a user client computer 102 and a server system 104 which are linked together by the Internet 106. The client computer 102 and server system 104 each include input and output devices, at least one processor, memory, and storage. The user client computer 102 may be any type of computing device that allows a user (or "trainee") to interactively browse Web sites via a Web browser 108. For example, the user computer may be a personal computer that runs the Windows NT operating system. Although one embodiment of the invention will be described relative to a client and a server that communicate over a network, one of ordinary skill in the art will appreciate that the invention may be implemented as a stand-alone system that is stored on a computer-readable medium, such as a hard disk, CD, DVD, floppy disk, and executed on a computer.

The user client computer 102 includes a display device with which a user interacts with the server system via a graphical user interface (GUI). In a preferred embodiment, the GUI includes a virtual world window 136, chat/NLI query window 138, and web browser 108. At certain times during the interactive training process, discussed in further detail below, a video window will appear and streaming video content from server system 104 will be delivered to the client computer 102 for presentation to the user. The user may view portions of the content as it is streamed. Overflow data will be stored in a local buffer for later viewing. While a file is being displayed, it may simultaneously be stored in a local system cache, or auxiliary memory storage.

The virtual world window 136 displays the worlds of the present invention to the user, and enables the user to navigate within each world. Images in the virtual world window 136 are constructed with software packages Renderware 3.0, 3d Studio Max, Character Max, or other commercially available graphics packages utilizing graphic artists' pictures. Functionality within the virtual world window, e.g., enabling the user to navigate within the world, turn around, interact with people, interact with objects within the world is discussed in further detail below. The images and interaction displayed to the user are meant to incorporate as much as possible the look and feel of a real-world installation and or repair. The NLI/Chat window 138 displays textual information to the user and allows the user to enter textual information. The NLI/Chat functionality is enabled via EasyAsk, Java and Microsoft Access 2000. The NLI/Chat window enable the user to ask free form questions and then pose them to a variety of virtual personalities. Directly below the space for questions to be entered will be the response box. The Web browser displays a web browser virtual world that is continually updated to display a virtual world based on user movement within the virtual world window 138. The web browser virtual world is also created using commercial graphics packages such as Swift 3D, 3D Studio Max, Adobe Photoshop 6.0, and utilizes HTML, JavaScript and Flash 5.0. User actions within the virtual world window, web browser window, and NLI/Chat window are communicated to the web browser 108 which interacts with server system 104.

The server system 104 provides various functionality for allowing users to interactively train to perform selected tasks associated with the installation and/or repair of telecommunications equipment. As described below, the server system 104 includes a software application 110 that implements the processes utilized by users of client computers 102 to interactively train to perform selected tasks associated with the installation and/or repair of telecommunications equipment. These processes are further described below, and include receiving job orders, interacting with virtual persons, travelling to job sites, performing virtual repair and installations of telecommunications equipment, asking questions and receiving answers when help is desired, and receiving feedback after tasks are completed. The software application 110 includes subcomponent software programs such as a movement engine 112, natural language interface (NLI) engine 114, chat engine 116, action/event engine 118, and evaluation engine 120, whose functions are described in further detail below. The software application and the functions performed by its subcomponent programs may be executed using the server system processor. The server system 104 further comprises a chat database 122, Q&A database 124, NLI database 126, movement database 128, context database 130, and event database 132 whose functions are described in further detail below. The databases are managed by a database manager 134 which allows the software application 110 to query each database, which returns the results of the search to the software application 110. The server system 104 also includes a video presentation application, which may be, for example, a streaming application.

In operation, a user accesses the server system 104 via a client computer 102 using a standard web browser 108, such as Microsoft's Internet Explorer, and the web browser 108 communicates with the web server 134 of the server system 104 utilizing HTTP protocol. Multiple clients 102 may be remote from the server system 104, allowing multiple users at remote locations to simultaneously utilize the training simulation. The web server 134 accesses a local store of images stored in the movement database 128 which can be requested, retrieved and viewed by a user at a client computer 102 using web browser 108. At the current time, web pages are typically defined in part using Hyper-Text Markup Language. These web pages may, for example, include images of virtual persons or virtual locations. Any information, such as user actions entered by a user at the client computer 102 are sent from the client computer 102 to the web server 134 for further processing in conjunction with the software application 110. The web server 134 initiates the software application 110 to process information received from the client computer 102.

The movement engine 112 controls the movements made by the user within the world. Movements are made by the user using a user input device at the client. The user input device may be a mouse, joystick, keyboard, or other virtual reality input device. The movement engine allows user to navigates within the virtual world, interacts with virtual persons and components. In conjunction with the chat engine and or NLI engine, the movement engine allows a user to approach other characters or avatars within the virtual world and engage in conversation. When a user navigates to a particular area in the virtual world, this may prompt an event in the web browser to allow the user to perform an action. The movement engine in conjunction with the action engine also manages bump collisions, or interactions with virtual persons. When a user input is received or when the user navigates within a predetermined distance of a virtual person, the virtual person may initiate interaction with the user in the virtual world. The movement engine in conjunction with the action engine also monitors incorrect actions by the user, and is responsible for determining whether to present a video stored in the context database.

The natural language interface (NLI) engine 114 enables the user to ask questions at any time during the training process. The NLI database 126 contains content that is accessed and presented to the user by the NLI engine 114. All user questions and answers are stored in the Q&A database 124 for future use by the evaluation engine 120.

The chat engine 116 enables real-time chat over the internet such as instant messaging between multiple users at different clients 102, as well as between a user at a client 102 and a trainer at the server system 104. The chat database 122 contains the chat history and sequencing of all user chats.

The action/event engine 118 monitors and records the actions the user makes, determines whether the user actions are appropriate, and responds to the user action when appropriate. The action events engine responds to the user actions, either permitting or prohibiting certain subsequent actions, or presenting certain information to the user in response to a user action. In response to an incorrect user action, the action events may access a video stored in the context database and present it to the user. The actions event engine allows for the remediation and feedback following completion of the training process by providing a history of all the actions taken by the user. For example, the evaluation engine would utilize the data recorded by the action events engine to present to the user actions which should have been performed differently or in a different order The evaluation engine 120 compiles and analyzes the information stored in the context database, event database, Q&A database, and chat database to provide a performance analysis report to the user following completion of the training exercise.

Triage serviet 137 is a persistent applet running on server system 104 that can fulfill multiple requests. Triage servlet 137 interacts with each engine of software application 110 and Web server 134 to control the context and state of all user interactions and context.

The movement database 128 stores all of the images for access by the movement engine to present to a user at a client computer. As the user at the client computer 102 navigates around the virtual world, the movement engine supplies the appropriate images based on user location within the virtual world.

The context database 130 monitors the current state the user is in with respect to current location and previous actions. It is a compilation of both user position and actions to contextualize the NLI engine and Chat engine in conjunction with the NLI DB and chat database. In response to a user inquiry received by the NLI engine, the NLI engine accesses the context database to determine the current user state and actions completed, and then accesses the NLI database to retrieve an appropriate response. For example, if a user enters a question such as "What do I do?" directed at the supervisor while the user is the garage, the NLI engine will access the context database and respond appropriately. For example, if the user is in the garage, the supervisor may respond "First you should check your work order and then select the appropriate tools and call your customer." Once the user selects and views the work order, this information is stored in the context database. Any subsequent question by the user, even if the same question as asked before, may result in a different response since the NLI engine will respond based on the actions previously completed by the user.

The event database contains a history of all the actions and events by a user. Actions and events include where the user navigated, who the user interacted with, and what actions the user performed during installation and or repair of equipment.

Figure 2:
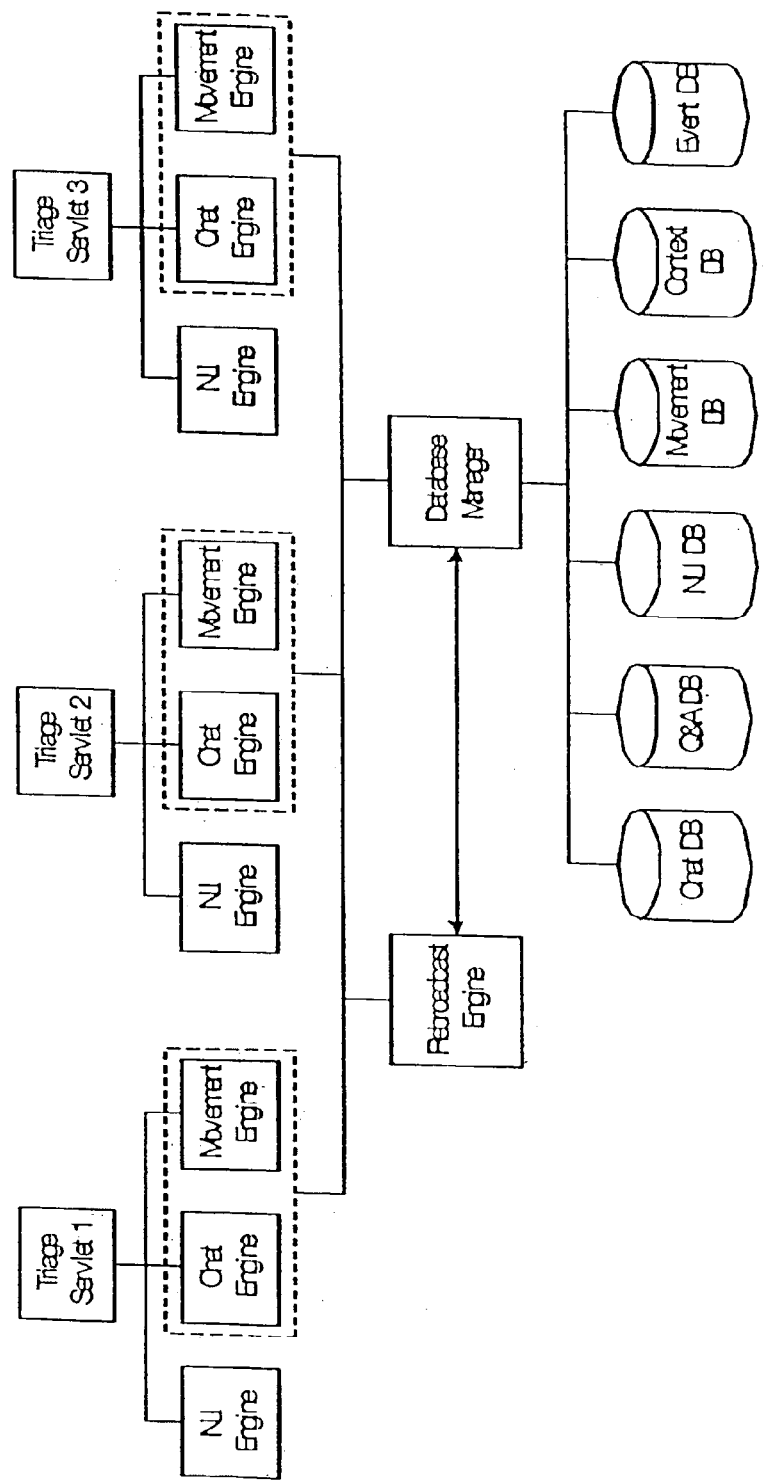
FIG. 2 illustrates the enterprise architecture of a presently preferred embodiment of the invention.
Figure 3A:
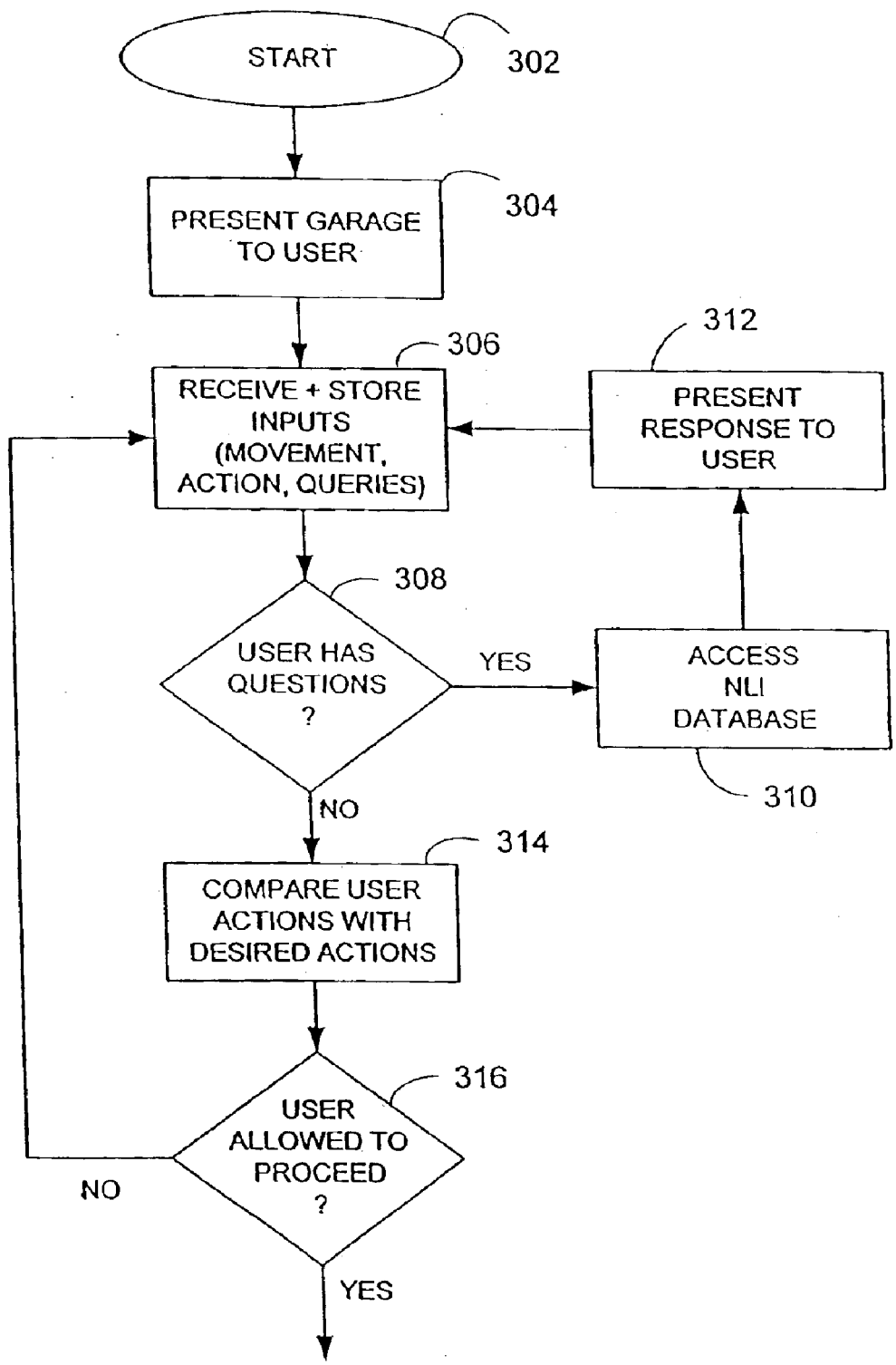
FIGS. 3A–3E are flow diagrams of the process which enables a user to interactively train to perform selected tasks associated with the installation and/or repair of telecommunications equipment.
Figure 3B:
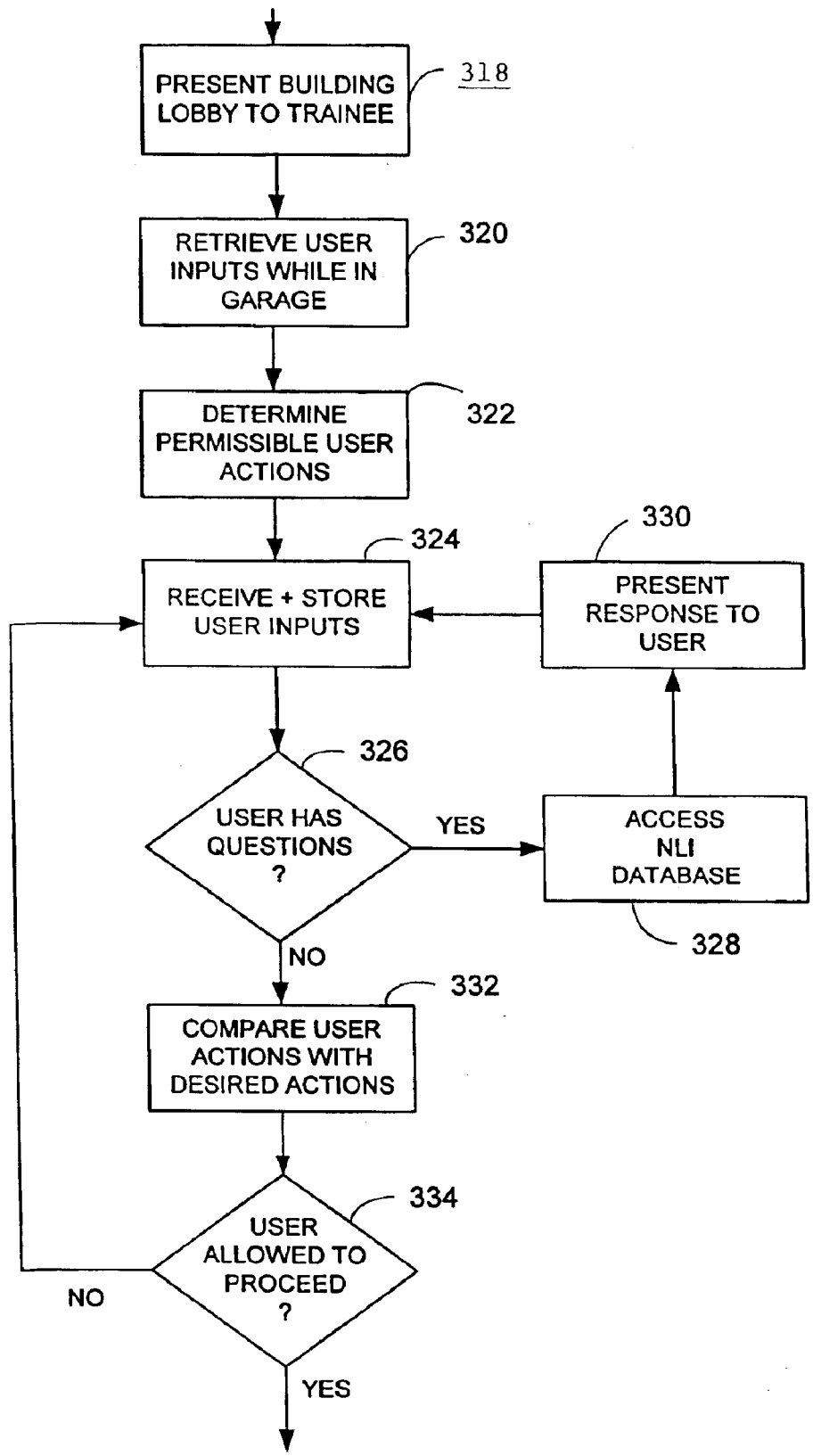
Figure 3C:
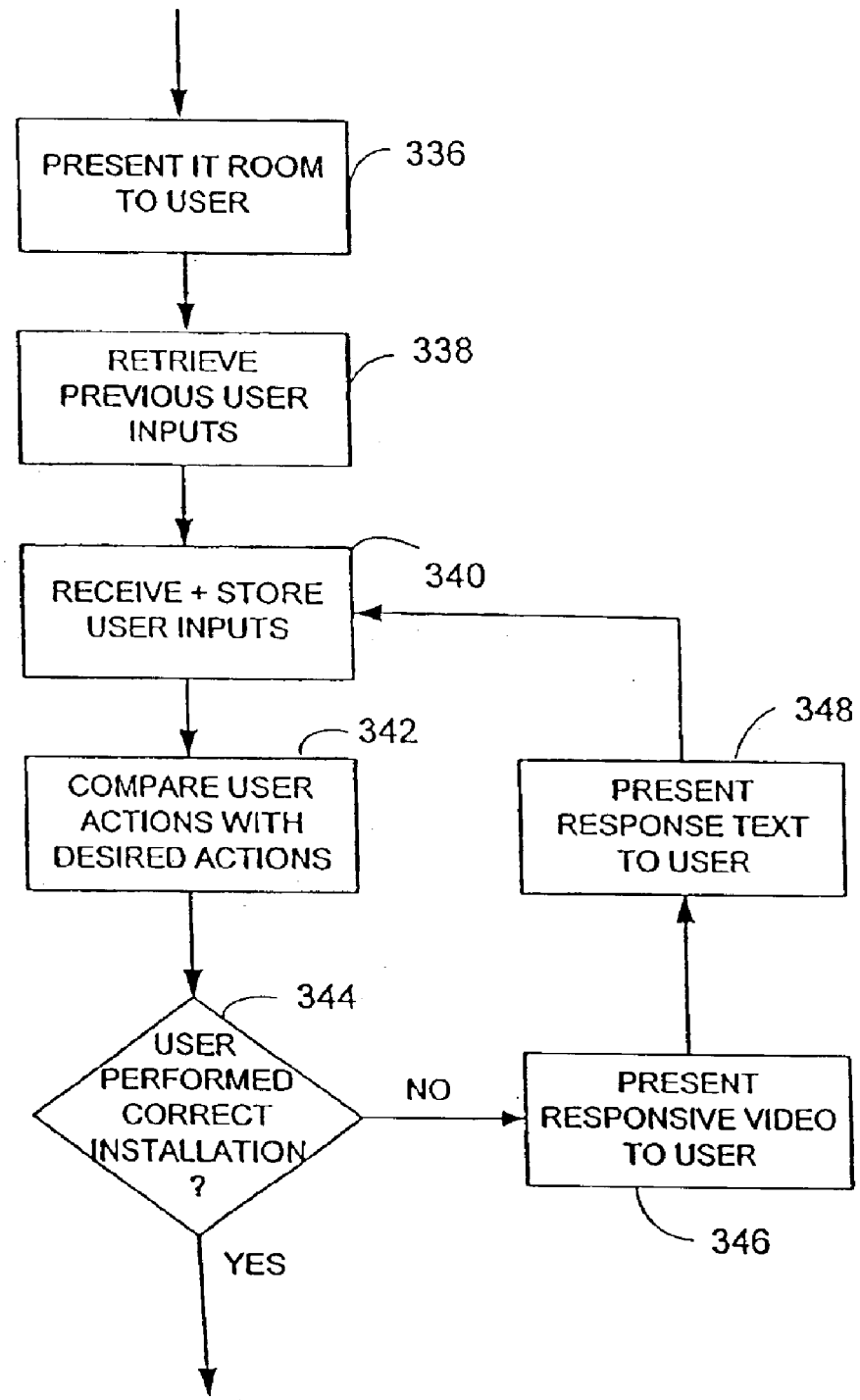
Figure 3D:
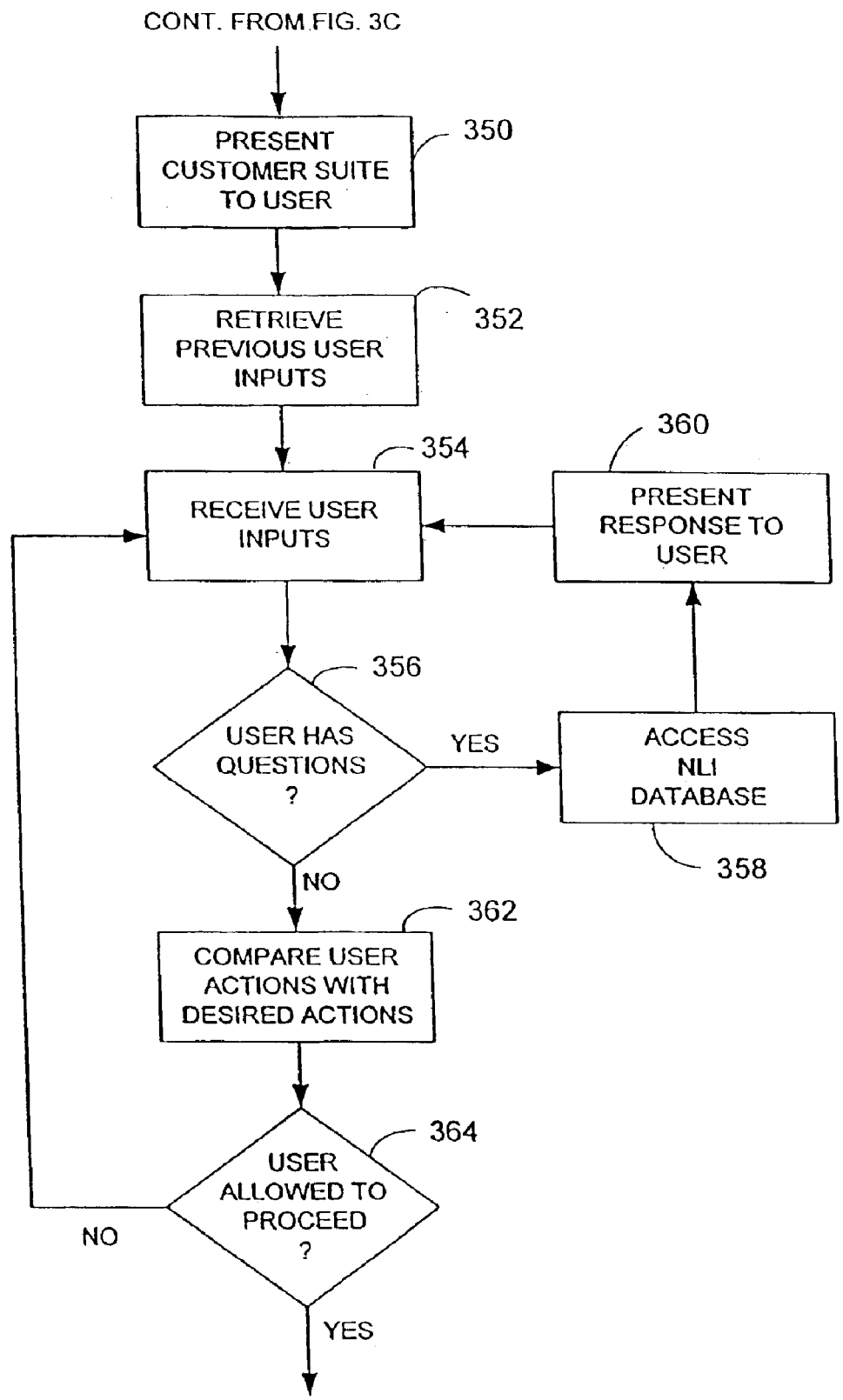
Figure 3E:
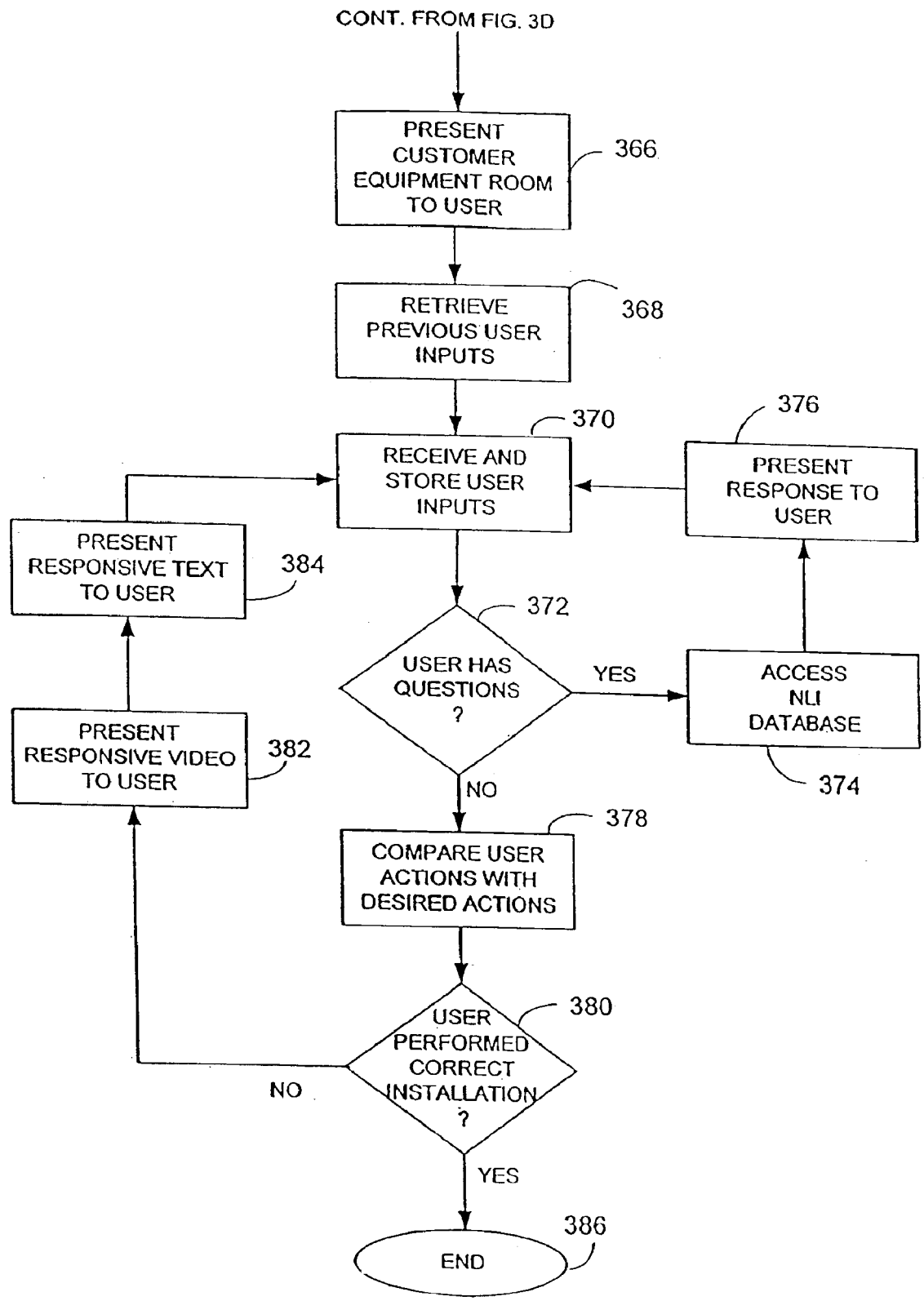

Referring to FIG. 2, the enterprise architecture of an embodiment of the present invention is illustrated. The enterprise architecture allows multiple users at different client computers to access and use the present invention simultaneously. For each user, a triage servlet is established running on server system 104. Each triage servlet can independently interact with each engine of the software application 110.

Figure 4:
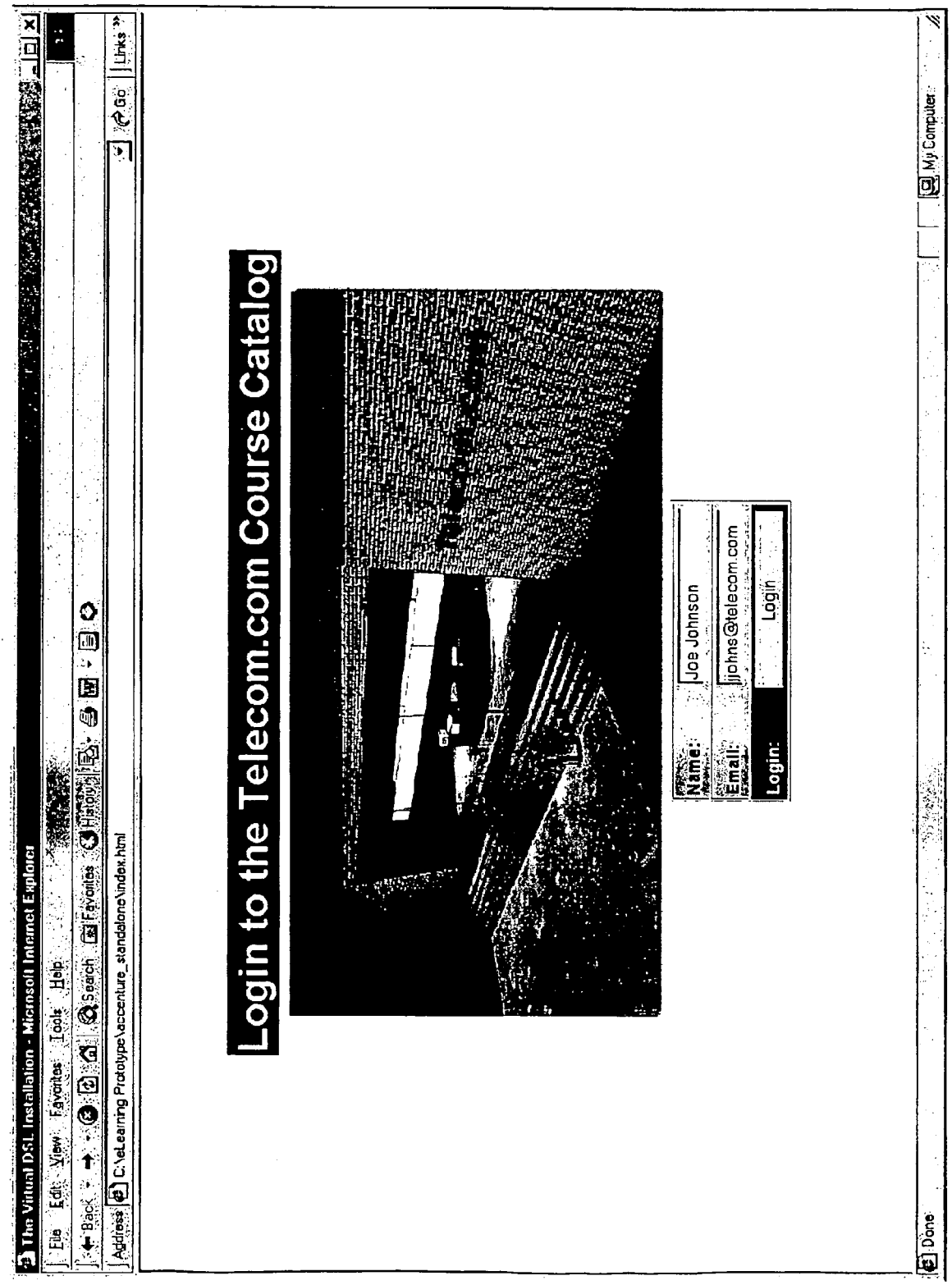
FIG. 4 is a screen shot illustrating the login process.
Figure 5:
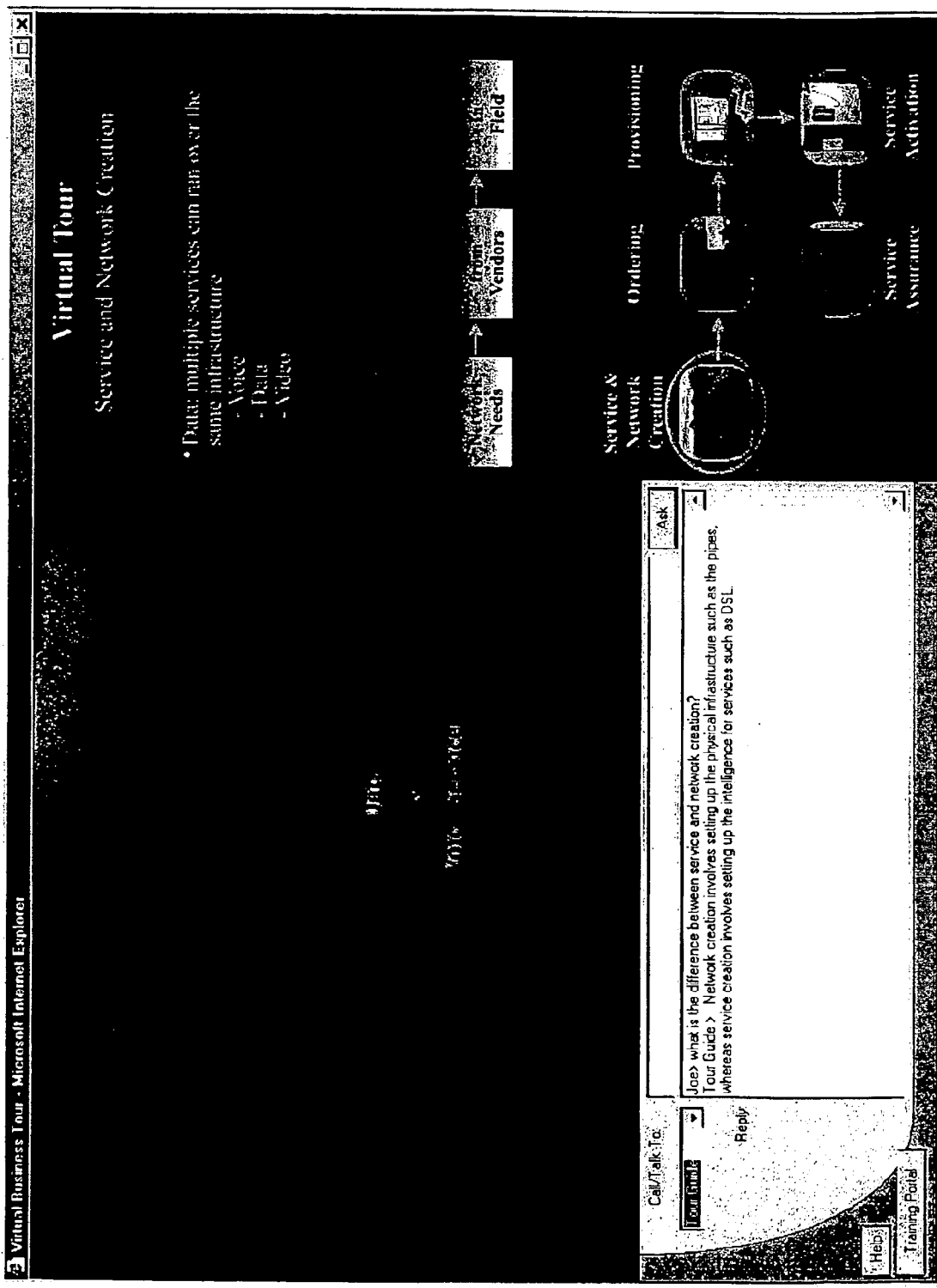
FIG. 5 is a screen shot illustrating the Virtual Business Process tour.
Figure 6:
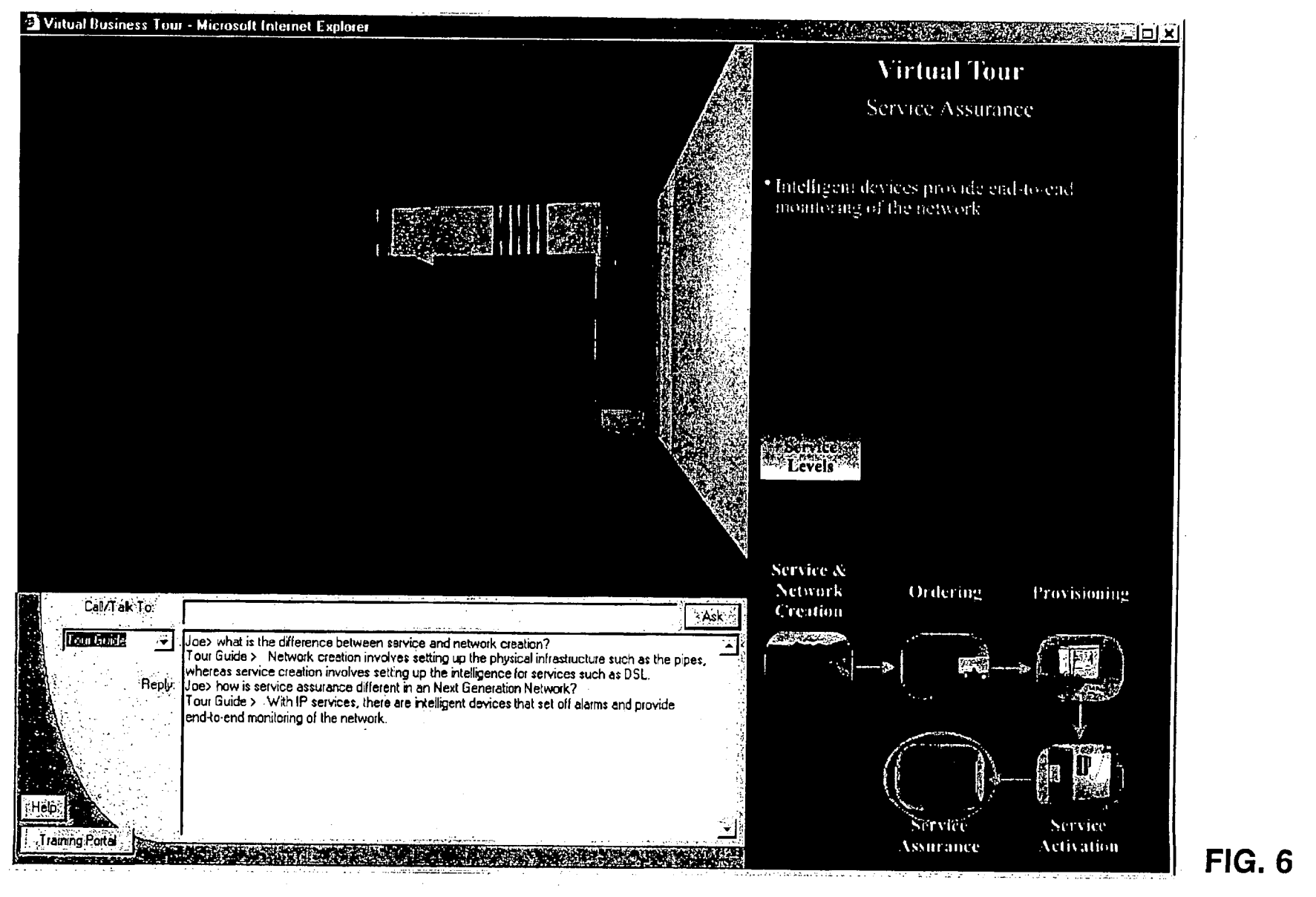
Figure 7:
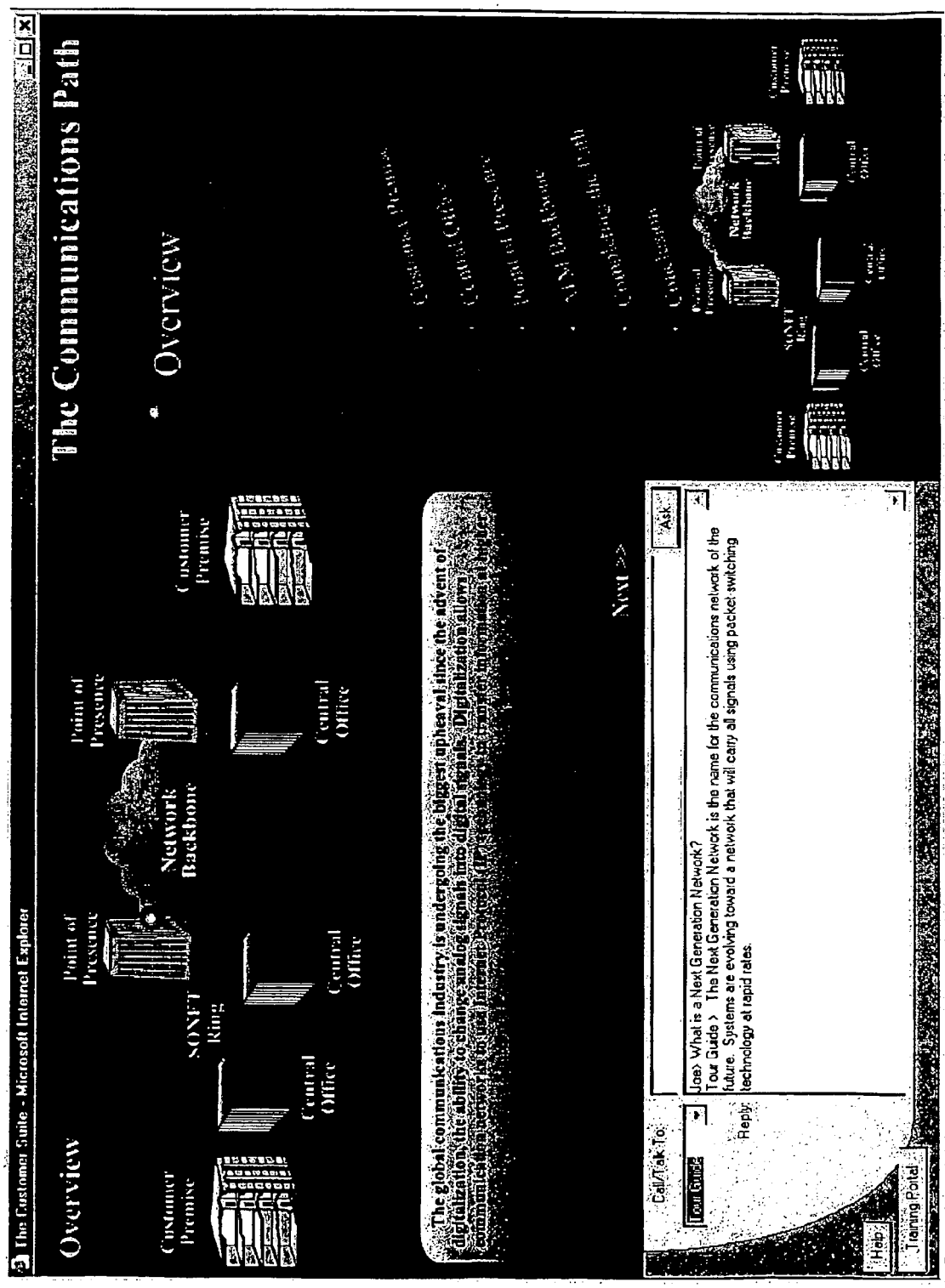
FIG. 7 is a screen shot illustrating the Communications Path Overview.
Figure 8:
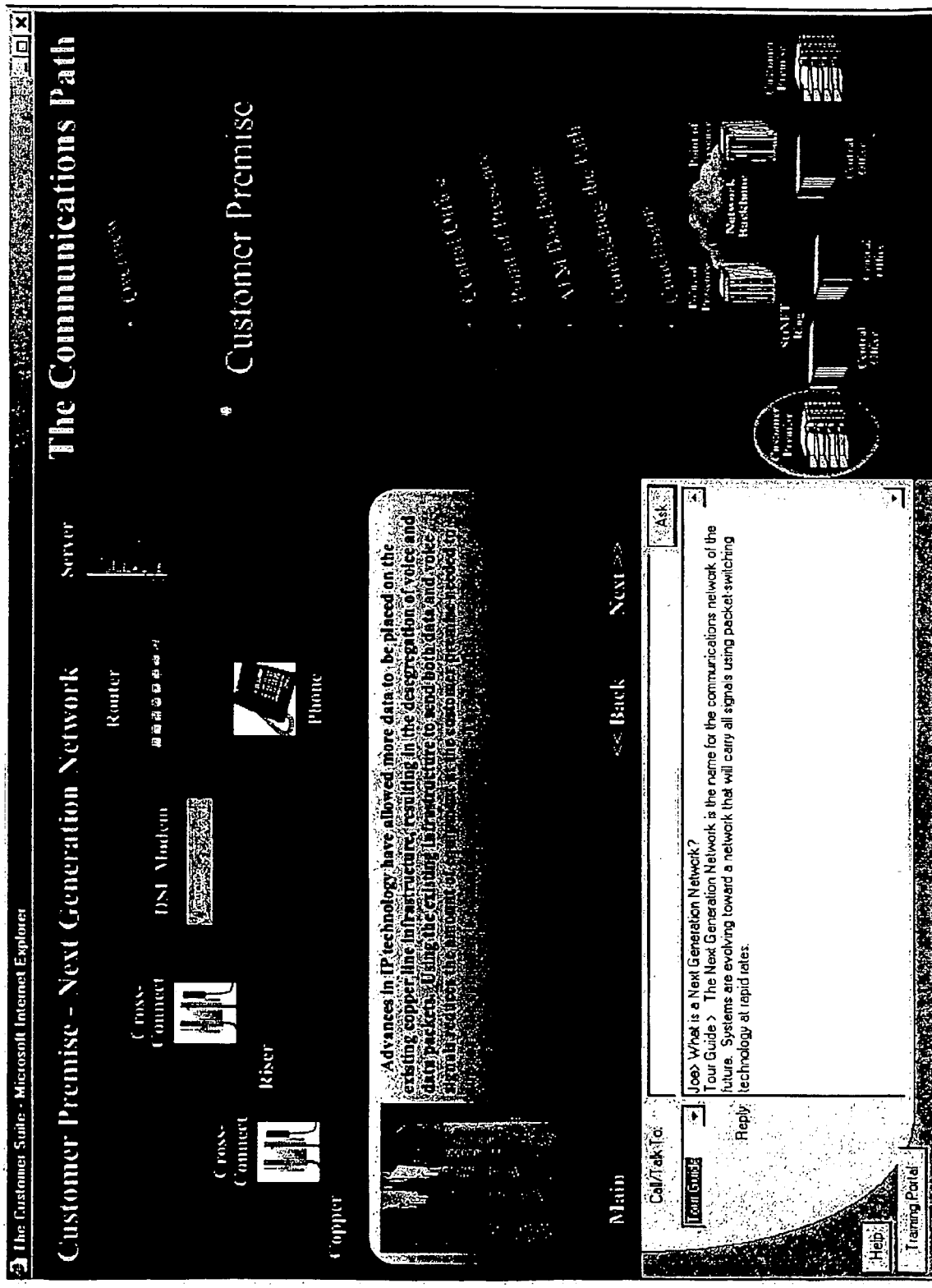
FIG. 8 is a further screen shot illustrating the Communications Path Overview.

Prior to accessing the software application 110, the user must sign in with his or her name and password. Referring to FIG. 4, an illustrative screen shot is shown presenting the user with a login screen, prompting the user to enter his or her name, e-mail address, and login password. Once the user has been granted access, the user may select to begin the interactive simulation. In addition, prior to beginning the interactive simulation, the user may select to view a Business Process tour which presents to the user information that helps the user learn the overall telecommunications business. Alternatively, the user may select to view the Communications Path Tour, which present to the user content related to telecommunications network infrastructure. Referring to FIGS. 5 and 6, illustrative screen shots are shown presenting the user with information during the Business Process Tour. Referring to FIGS. 7 and 8, illustrative screen shots are shown presenting the use with information during the Communications Path Overview.

Figure 9:
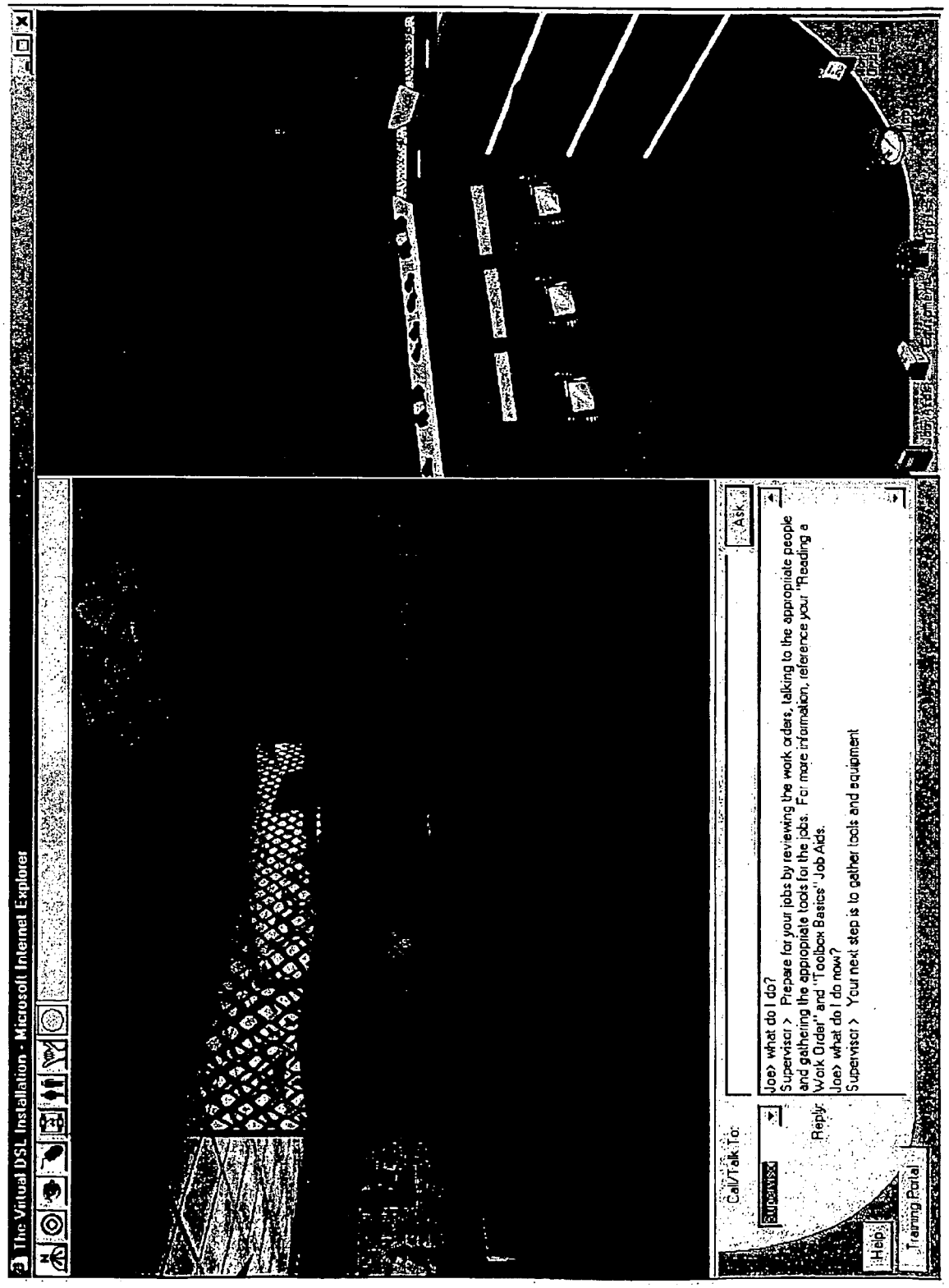
FIG. 9 is a screen shot illustrating the screen presented to the user in the garage world.

FIGS. 3A–3E are a flow diagram of the process which enables a user to interactively train to perform selected tasks associated with the installation and/or repair of telecommunications equipment using server system 104. At step 304, the server system 304 presents the garage world to the user at the client computer 102. FIG. 9 is a screen shot illustrating the screen presented to the user in the garage world.

At step 306, the server system 104 receives and stores inputs by the user in the garage world. An illustrative garage world is established using the following code:

```
world {
    name="GarageScene"
    ID="1"
    description="A test world for script debugging"
    mainURL="http://127.0.0.1/HoloStation3/GarageScene"
    modelURL="http://127.0.0.1/HoloStation3/GarageScene/Models/"
    textureUFL="http://127.0.0.1/HoloStation3/GarageScene/Textures/"
    scriptUPL="http://127.0.0.1/HoloStation3/GarageScene/Scripts/"
    mediaURL="http://127.0.0.1/HoloStation3/GarageScene/Media/"
    actionURLBase="E:\Program Files\Apache Group\Apache\htdocs\accenture_standalone\web\"
    InitPos=".866,-.500,0,0,0,1,-.500,-.866,0,1.5,0,.9"
    camera {
        name="eye"
        xOffset="0.2"
        yOffset="1.0"
        zOffset="0.0"
        rotX="0.0"
        rotY="0.0"
        rotZ="0.0"
        active="yes"
    }
    camera {
        name="front"
        xOffset="0"
        yOffset="0.5"
        zOffset="5.0"
        rotX="0.0"
        rotY="180.0"
        rotZ="0.0"
    }
    camera {
        name="back"
        xOffset="0"
        yOffset="0.5"
        zOffset="-3.0"
        rotX="8.0"
        rotY="0.0"
        rotZ="0.0"
    }
    avatar {
        name="FemaleTech"
        ID="2"
        URL="http://127.0.0.1/HoloStation3/Avatars/Models/FemaleTech.DFF.hs3"
        version="1.0"
        geometry_name ="FemaleTech.dff"
        geometry_version="1.0"
        active="yes"
        geometry_URL="http://127.0.0.1/HoloStation3/Avatars/Models/FemaleTech.DFF.hs3"
        animation {
            type="walk"
            name="FemaleTech"
            version="1.0"
            URL="http://127.0.0.1/HoloStation3/Avatars/Scripts/FemaleTech.ska.hs3"
            divisor="250"
        }
        animation {
            type="wait"
            name="FemaleTech"
            version="1.0"
            URL="http://127.0.0.1/HoloStation3/Avatars/Scripts/FemaleTech.ska.hs3"
            divisor="250"
        }
        gesture {
            name="FemaleTech"
            version="1.0"
            URL="http://127.0.0.1/HoloStation3/Avatars/Scripts/FemaleTech.ska.hs3"
                    menu_name="Wave"
            divisor="250"
        }
    }
    avatar {
        name="FemaleTech01"
        ID="3"
        URL="http://127.0.0.1/HoloStation3/Avatars/Models/FemaleTech01.DFF.hs3"
        version="1.0"
        geometry_name = "FemaleTech01.dff"
        geometry_version="1.0"
        geometry_URL="http://127.0.0.1/HoloStation3/Avatars/Models/FemaleTech01.DFF.hs3"
```

```
        animation {
            type="walk"
            name="FemaleTech01"
            version="1.0"
URL="http://127.0.0.1/HoloStation3/Avatars/Scripts/FemaleTech01.ska.hs3"
            divisor="250"
        }
        animation {
            type="wait"
            name="FemaleTech01"
            version="1.0"
URL="http://127.0.0.1/HoloStation3/Avatars/Scripts/FemaleTech01.ska.hs3"
            divisor="250"
        }
        gesture {
            name="FemaleTech01"
            version="1.0"
URL="http://127.0.0.1/HoloStation3/Avatars/Scripts/FemaleTech.ska.hs3"
                    menu_name="Wave"
            divisor="250"
        }
}
avatar {
    name="FemaleTech02"
    ID="4"
URL="http://127.0.0.1/HoloStation3/Avatars/Models/FemaleTech02.DFF.hs3"
    version="1.0"
    geometry_name = "FemaleTech02.dff"
    geometry_version="1.0"
geometry_URL="http://127.0.0.1/HoloStation3/Avatars/Models/FemaleTech02.DFF.hs3"
        animation {
            type="walk"
            name="FemaleTech02"
            version="1.0"
URL="http://127.0.0.1/HoloStation3/Avatars/Scripts/FemaleTech02.ska.hs3"
            divisor="250"
        }
        animation {
            type="wait"
            name="FemaleTech02"
            version="1.0"
URL="http://127.0.0.1/HoloStation3/Avatars/Scripts/FemaleTech02.ska.hs3"
            divisor="250"
        }
        gesture {
            name="FemaleTech02"
            version="1.0"
URL."http://127.0.0.1/HoloStation3/Avatars/Scripts/FemaleTech02.ska.hs3"
                    menu_name="Wave"
            divisor="250"
        }
}
avatar {
    name="FemaleTech03"
    ID="5"
URL="http://127.0.0.1/HoloStation3/Avatars/Models/FemaleTech03.DFF.hs3"
    version="1.0"
    geometry_name ="FemaleTech03.dff"
    geometry_version="1.0"
geometry_URL="http://127.0.0.1/HoloStation3/Avatars/Models/FemaleTech03.DFF.hs3"
        animation {
            type="walk"
            name="FemaleTech03"
            version="1.0"
URL="http://127.0.0.1/HoloStation3/Avatars/Scripts/FemaleTech03.ska.hs3"
            divisor="250"
        }
        animation {
            type="wait"
            name="FemaleTech03"
            version="1.0"
URL="http://127.0.0.1/HoloStation3/Avatars/Scripts/FemaleTech03.ska.hs3"
            divisor="250"
        }
        gesture {
            name="FemaleTech03"
            version="1.0"
URL="http://127.0.0.1/HoloStation3/Avatars/Scripts/FemaleTech03.ska.hs3"
                    menu_name="Wave"
```

```
                divisor="250"
            }
        }
    avatar {
        name="MaleTech"
        ID="6"
URL="http://127.0.0.1/HoloStation3/Avatars/Models/MaleTech.DFF.hs3"
        version="1.0"
        geometry_name = "MaleTech.dff"
        geometry_version="1.0"
geometry_URL="http://127.0.0.1/HoloStation3/Avatars/Models/MaleTech.DFF.hs3"
        animation {
            type="walk"
            name="MaleTech"
            version="1.0"
URL="http://127.0.0.1/HoloStation3/Avatars/Scripts/MaleTech.ska.hs3"
            divisor="250"
        }
        animation {
            type="wait"
            name="MaleTech"
            version="1.0"
URL="http://127.0.0.1/HoloStation3/Avatars/Scripts/MaleTech.ska.hs3"
            divisor="250"
        }
        gesture {
            name="MaleTech"
            version="1.0"
URL="http://127.0.0.1/HoloStation3/Avatars/scripts/MaleTech.ska.hs3"
                menu_name="Wave"
            divisor="250"
        }
    }
    avatar {
        name="MaleTech01"
        ID="7"
URL="http://127.0.0.1/HoloStation3/Avatars/Models/MaleTech01.DFF.hs3"
        version="1.0"
        geometry_name ="MaleTech01.dff"
        geometry_version="1.0"
geometry_URL="http://127.0.0.1/HoloStation3/Avatars/Models/MaleTech01.DFF.hs3"
        animation {
            type="walk"
            name="MaleTech01"
            version="1.0"
URL="http://127.0.0.1/HoloStation3/Avatars/Scripts/MaleTech01.ska.hs3"
            divisor="250"
        }
        animation {
            type="wait"
            name="MaleTech01"
            version="1.0"
URL="http://127.0.0.1/HoloStation3/Avatars/Scripts/MaleTech01.ska.hs3"
            divisor="250"
        }
        gesture {
            name="MaleTech01"
            version="1.0"
URL="http://127.0.0.1/HoloStation3/Avatars/Scripts/MaleTech01.ska.hs3"
                menu_name="Wave"
            divisor="250"
        }
    }
    avatar {
        name="MaleTech02"
        ID="8"
URL="http://127.0.0.1/HoloStation3/Avatars/Models/MaleTech02.DFF.hs3"
        version="1.0"
        geometry_name = "MaleTech02.dff"
        geometry_version="1.0"
geometry_URL="http://127.0.0.1/HoloStation3/Avatars/Models/MaleTech02.DFF.hs3"
        animation {
            type="walk"
            name="MaleTech02"
            version="1.0"
URL="http://127.0.0.1/HoloStation3/Avatars/Scripts/MaleTech02.ska.hs3"
            divisor="250"
        }
        animation {
```

```
            type="wait"
            name="MaleTech02"
            version="1.0"
URL="http://127.0.0.1/HoloStation3/Avatars/Scripta/MaleTech02.ska.hs3"
            divisor="250"
        }
        gesture {
            name="MaleTech02"
            version="1.0"
URL="http://127.0.0.1//HoloStation3/Avatars/Scripts/MaleTech02.ska.hs3"
                menu_name="Wave"
            divisor="250"
        }
}
avatar {
        name="MaleTech03"
        ID="9"
URL="http://127.0.0.1/HoloStation3/Avatars/Models/MaleTech03.DFF.hs3"
        version "1.0"
        geometry_name = "MaleTech03.dff"
        geometry_version="1.0"
geometry_URL="http://127.0.0.1/HoloStation3/Avatars/Models/MaleTech03.DFF.hs3"
        animation {
            type="walk"
            name="MaleTech03"
            version="1.0"
URL="http://127.0.0.1/HoloStation3/Avatars/Scripts/MaleTech03.ska.hs3"
            divisor="250"
        }
        animation {
            type="Wait"
            name="MaleTech03"
            version="1.0"
URL="http://127.0.0.1/HoloStation3/Avatars/Scripts/MaleTech03.ska.hs3"
            divisor="250"
        }
        gesture {
            name="MaleTech03"
            version="2.0"
URL="http://127.0.0.1/HoloStation3/Avatars/Scripts/MaleTech03.ska.hs3"
                menu_name="Wave"
            divisor="250"
        }
}
scene {
        name="mainScene"
        BSP {
            name="Garage"
            version="1.0"
URL="http://127.0.0.1/HoloStation3/GarageScene/Models/Garage.bsp.hs3"
        }
        animatedmodel {
            name="Supervisor"
            model {
                geometry {
                    name="supervisor.dff"
                    version="1.0"
URL="http://127.0.0.1/HoloStation3/GarageScene/Models/Supervisor.DFF.hs3"
                }
                instance {
                    matrix="-.985,-.174,0,0,0,1,-.174,.985,0,-5.375,6.495,.845"
                }
            }
            animation {
                type="sequence"
                name="supervisor"
                version="1.0"
URL="http://127.0.0.1/HoloStation3/GarageScene/Scripts/supervisor.ska.hs3"
                divisor="1000"
            }
        }
        animatedmodel {
            name="PeerTech01"
            model }
                geometry {
                    name="PeerTech01.DFF"
                    version="1.0"
URL="http://127.0.0.1/HoloStation3/GarageScene/Models/PeerTech01.DFF.hs3"
                }
```

```
                    instance {
                        matrix="-0.903,-.431,0,0,0,1,-.431,.931,0,-4.514.-.785,1.086"
                        Always Render="no"
                    }
                }
                animation {
                    type="sequence"
                    name="PeerTech01"
                    version="1.0"
URL="http://127.0.0.1/HoloStation3/GarageScene/Scripts/PeerTech01.ska.hs3"
                    divisor="1000"
                }
            }
            animatedmodel {
                name="PeerTech02"
                model {
                    geometry {
                        name="PeerTech02.DFF"
                        version="1.0"
URL="http://127.0.0.1/HoloStation3/GarageScene/Models/PeerTech02.DFF.hs3"
                    }
                    instance {
                        matrix="-.174,.985,0,0,0,1,.985,.174,0,-6.044,-.769,1.086"
                        AlwaysRender="no"
                    }
                }
                animation {
                    type="sequence"
                    name="PeerTech02"
                    version="1.0"
URL="http://127.0.0.1/HoloStation3/GarageScene/Scripts/PeerTech02.ska.hs3"
                    divisor="1000"
                }
            }
            animatedmodel {
                name="PeerTech03"
                model {
                    geometry {
                        name="PeerTech03.DFF"
                        version="1.0"
URL="http://127.0.0.1/HoloStation3/GarageScene/Models/PeerTech03.DFF.hs3"
                    }
                    instance {
                        matrix=".903,.431,0,0,0,1,.431,-.431, -.903,0,-5.072,-1.1661, 1.086"
                        AlwaysRender="no"
                    }
                }
                animation {
                    type="sequence"
                    name="PeerTech03"
                    version="1.0"
URL="http://127.0.0.1/HoloStation3/GarageScene/Scripts/PeerTech03.ska..hs3"
                    divisor="1000"
                }
            }
            model {
                geometry {
                    name="door.dff"
                    version="1.0"
URL="http://127.0.0.1/HoloStation3/GarageScene/Models/door.dff.hs3"
                }
                instance {
                    matrix="0,-1,0,0,0,1,-1,0,0,7.495,-4.996,1.350"
                    clickevent {
                        action {
                            type="CReqURLAction"
                            param="exitgarage.html"
                            param="hidden"
                        }
                    }
                }
            }
            model {
                geometry {
                    name="printer.dff"
                    version="1.0"
URL="http://127.0.0.1/HoloStation3/GarageScene/Models/printer.dff.hs3"
                }
                instance {
```

-continued

```
            matrix="-.998,-.061,0,.061,-.998,0,0,0,1,.744,6.931,.962"
            clickevent {
                action {
                    type="CReqURLAction"
                    param="workordermovie.html"
                    param="hidden"
                }
            }
        }
    }
    model {
        geometry {
            name="supplyshelf.dff"
            version="1.0"
URL="http://127.0.0.1/HoloStation3/GarageScene/Models/supplyshelf.dff.hs3"
        }
        instance {
            matrix="-1,0,0,0,-1,0,0,0,1,3.82,-3.094,0"
            clickevent {
                action {
                    type=CReqURLAction"
                    param="shelfmovie.html"
                    param="hidden"
                }
            }
        }
    }
}
NLIRespondent {
    name="Supervisor"
    ID="1"
}
NLIRespondent {
    name="Peer Technician"
    ID="2"
}
NLIRespondent {
    name="Bonnie (CSR)"
    ID="3"
}
NLIRespondent {
name="Sharon (Recep.)"
ID="4"
}
chatbutton {
    caption="Training Portal"
    url="getcatalog.html"
    dest="hidden"
}
startsound="true"
initservletURL="localhost:17319"
triageservletURL="localhost:17319"
startmultiuser="true"
        }
```

Those of ordinary skill in the art will recognize that equivalent garage worlds can be constructed using alternative code sets. The code for the garage world and the other worlds set forth below establish the look of the world, camera angles, characters or "avatars" that the user can select to represent himself or herself in the world, and actions that can be taken by the user within the world, as well as the ramifications of such actions. Also established are animated avatars within the world, their actions, and their interactions with the user. Geographic matrixes are established in the world that trigger actions when the user enters a matrix or clicks on a matrix with a user input device. For example, when the user navigates within the matrix surrounding an animated avatar, a sound file may be played representing speech of the animated avatar and a text file representing the speech of the animated avatar may appear in the NLI/Chat box. Similarly, when the user clicks on a matrix of a given piece of telecommunications equipment to perform a task, a close-up of the equipment or different piece of equipment may appear.

The purpose of the garage world is for the user to learn how to interact with the user's supervisor, obtain and print out work orders, and identify and gather the tools and equipment needed to perform the work order. The user must also identify and navigate to the client in order to perform the work order. The garage world is the user's work location. It is the user's primary work location where the user obtains and prints work orders, and selects equipment and tools. Shown in screenshot 9, the user's company name is telecom.com. The world utilizes the following icons: job aids, equipment tools, map, and work order. While in the garage world, the user navigates to a virtual computer where he can view his work order. The user can then print out the work order on a virtual printer shown in the world. The user then navigates to the printer within the virtual world and retrieves the work order, which appears as the user navigates to the printer in the virtual world. The work order can be viewed at any subsequent time by selecting the work order icon. The user then navigates to the equipment room, where the user selects the appropriate tools and equipment to complete the work order.

Figure 10:
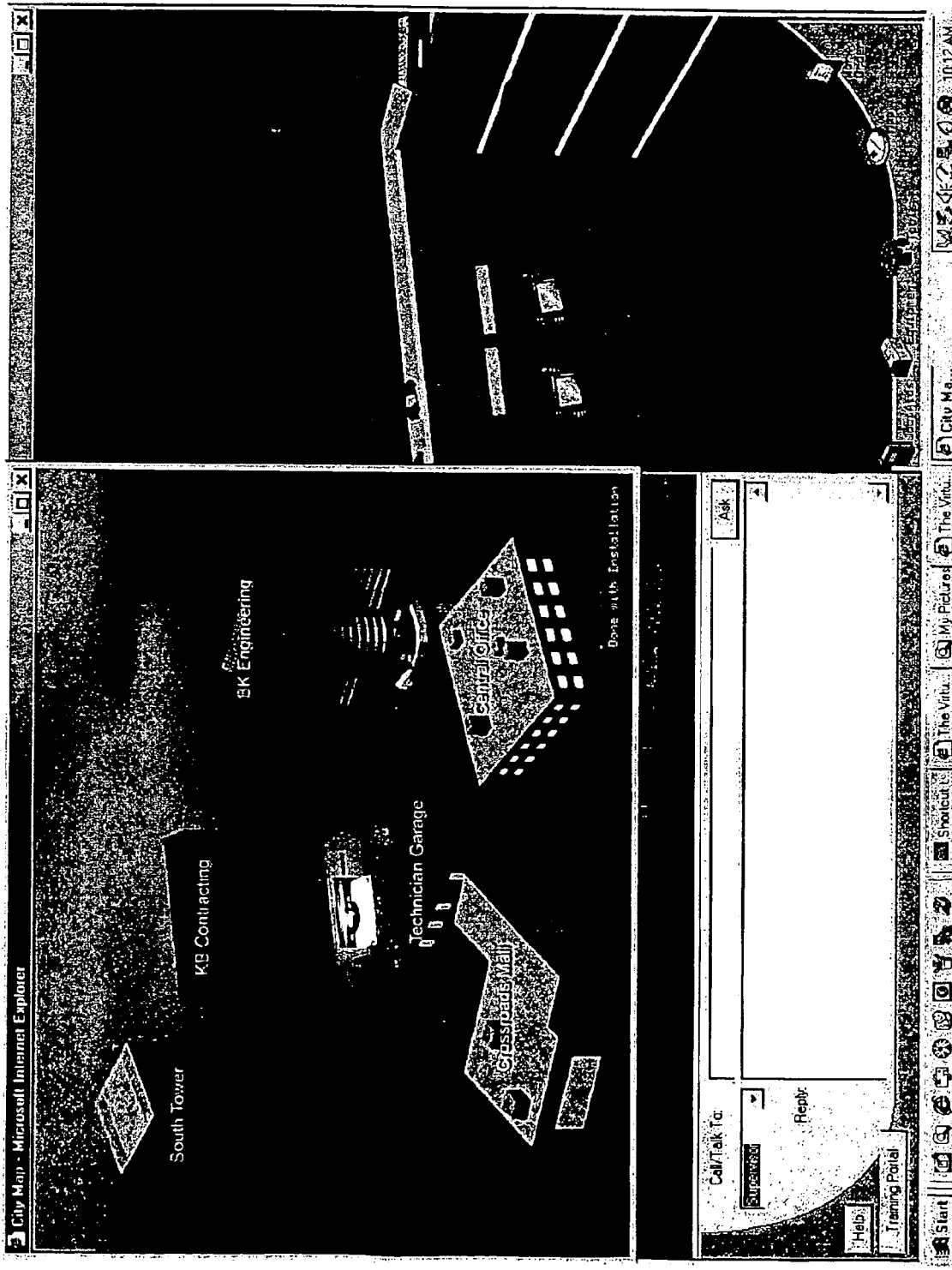
FIG. 10 illustrates a map showing various building locations.

Job aids are a presentation of material that a technician would potentially use in completing a work order. For example, if the technician needs assistance on how to install a DSL modem at the customer's site, they can access a job aid that will outline the general steps involved when performing the action in question. Other job aids include, How to Read a Work Order, What Questions to Ask Customers, and How to Punchdown a Cross connect. Once selected by the user in the garage, the job aids are available for use in later worlds presented to the user, such as in a customer equipment room. Customer equipment is empty until the user select items from the equipment shelf displayed in the virtual world, as illustrated in FIG. 9. The user selects the desired equipment from the supply shelf and drags it to the tool box so that it is available the rest of the simulation. The user also selects a tool belt from the supply shelf which contains certain tools. The user selects additional tools necessary for the work order from a list that appears to the user after the tool belt is selected. The selected tools are available to the user in future worlds by selecting the tools icon. After the user has selected the desired equipment and tools, the user selects the map icon. A map showing various building locations appears, as illustrated in the screenshot shown in FIG. 10, and the user selects the appropriate destination based on the work order.

At step 308, while the user is in the garage world, the user may input a question via the natural language interface. At step 310, the NLI engine 114 retrieves the appropriate response from the NLI database 126 utilizing information from the context database 130. At step 312, the server system 104 presents the response to the user at the client 102. At step 314, the action event engine 118 compares user actions with a predetermined set of desired actions stored in the context database. If the user has completed the predetermined set of desired actions required to move to the next world, the server system 104 presents the next world. If not, the server system presents information to the user to help the user perform the desired actions. Such information may take the form of short videos or text. Although a predetermined number of actions must be completed in order for the user to advance to the next world, not all incorrect actions prohibit advancement. Rather, the action event engine 118 will monitor and record incorrect actions which affect the user's future training and interactions in subsequent worlds.

Within the garage world, there are a number of avatars that the user can interact with. The supervisor, located behind the desk, can be asked questions around what steps need to be taken to complete the tasks in the garage. "What should I do?", "What tools do I need to install DSL?", are examples of the types of questions the user might ask the supervisor. In addition to the supervisor avatar, there a 3 peer technician avatars inside the garage world that are, similar to the supervisor, available for questioning.

Inside the garage world, the user is tasked with picking up his work order from the printer, selecting the appropriate tools and equipment from the tool cage, and calling the customer utilizing the chat/nli query window 138. Failing to complete the above tasks, results in feedback and/or inability to complete tasks in later worlds. If the user does not pick up the work order, the user will be unable to reference that item in a later world to complete the activities related to that world. If the user does not select the appropriate tools and equipment, those items will be unavailable for use in a later world. If the user does not call ahead to the customer, the user will be forced to call the customer upon entrance into the lobby world to gain access to the customer suite world. The server system presents the user with a city map showing several relevant buildings, including potential customers, a central office, and the user's garage. Based on the work order select the destination where the work order is to be performed. In the present example, a DSL installation at a customer, the user selects the building at which the customer is located. In alternative training scenarios, the user may select the central office if the service order required the user to install a high speed broadband data service. In addition, if the work order was directed at repair scenario rather than an installation scenario, the user would potentially need to go to the central office to do some troubleshooting and diagnosis.

Figure 11:
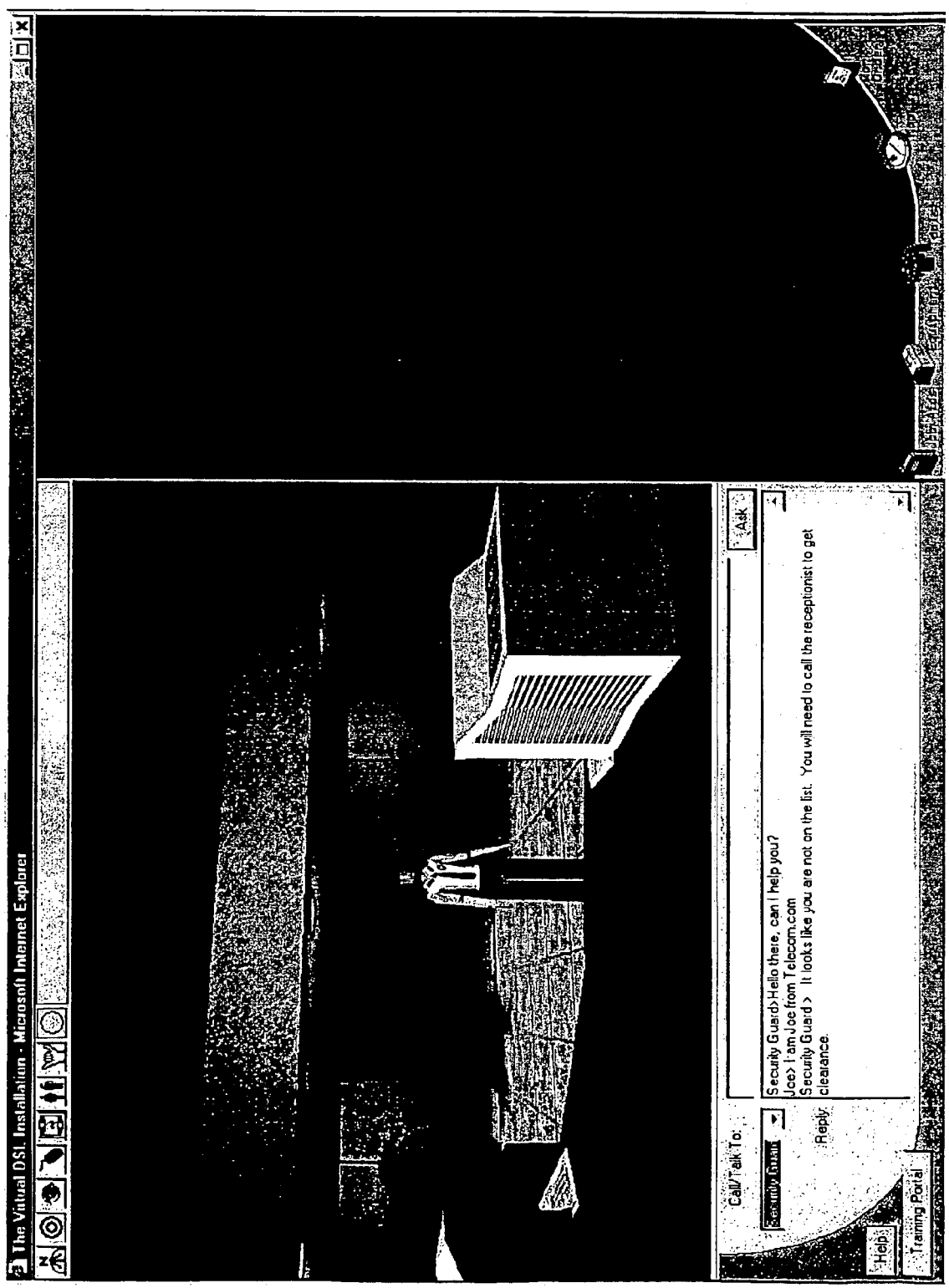
FIG. 11 is a screen shot illustrating the screen presented to the user in the building lobby world.

At step 318, the server system 304 presents the building lobby world to the user at the client computer 102. FIG. 11 is a screen shot illustrating the screen presented to the user in the building lobby world.

At step 320, the server system 104 receives and stores inputs by the user in the building lobby world. An illustrative lobby world is established using the following code:

```
world
    name="LobbyScene"
    ID="7"
    description="A test world for script debugging"
    mainURL="http://127.0.0.1/HoloStation3/LobbyScene"
    modelURL="http://127.0.0.1/HoloStation3/LobbyScene/Models/"
    textureURL="http://127.0 0.1/HoloStation3/LobbyScene/Textures/"
    scriptURL="http://127.0.0.1/HoloStation3/LobbyScene/Scripts/"
    mediauRL="http://127.0.0.1/HoloStation3/LobbyScene/Media/"
    InitPos="1,0,0,0,0,1,0,-1,0.0,-7.0,2.2"
    camera {
        name="eye"
        xOffset="0.2"
        yOffset="2.0"
        zOffset="0.0"
        rotX="0.0"
        rotY="0.0"
        rotZ="0.0"
        active="yes"
    }
    camera {
```

```
            name="front"
            xOffset="0"
            yOffset="0.5"
            zOffset="5.0"
            rotX="0.0"
            rotY="180.0"
            rotZ="0.0"
    }
    camera {
            name="back"
            xOffset="0"
            yOffset="0.5"
            zOffset="-3.0"
            rotX="8.0"
            rotY="0.0"
            rotZ="0.0"
    }
    avatar {
            name="FemaleTech"
            ID="2"
URL="http://127.0.0.1/HoloStation3/Avatars/Models/FemaleTechDFF.hs3"
            version="1.0"
            geometry_name = "FemaleTech.dff"
            geometry_version="1.0"
            active="yes"
geometry_URL="http://127.0.0.1/HoloStation3/Avatars/Models/FemaleTech.DFF.hs3"
            animation {
                    type="walk"
                    name="FemaleTech"
                    version="1.0"
URL="http://127.0.0.1/HoloStation3/Avatars/Scripts/FemaleTech.ska.hs3"
                    divisor="250"
            }
            animation {
                    type="wait"
                    name="FemaleTech"
                    version="1.0"
URL="http://127.0.0.1/HoloStation3/Avatars/Scripts/FemaleTech.ska.hs3"
                    divisor="250"
            }
            gesture {
                    name="FemaleTech"
                    version="1.0"
URL="http://127.0.0.1/HoloStation3/Avatars/Scripts/FemaleTech.ska.hs3"
                            menu_name ="Wave"
                    divisor="250"
            }
    }
    avatar {
            name="FemaleTech01"
            ID="3"
URL="http://127.0.0.1/HoloStation3/Avatars/Models/FemaleTech01.DFF.hs3"
            versjon="1.0"
            geometry_name ="FemaleTech01.dff"
            geometry_version="1.0"
geometry_URL="http ://127.0.0.1/HoloStation3/Avatars/Models/FemaleTech01.DFF.hs3"
            animation {
                    type="walk"
                    name="FemaleTech01"
                    version="1.0"
URL="http://127.0.0.1/HoloStation3/Avatars/Scripts/FemaleTech01.ska.hs3"
                    divisor="250"
            }
            animation {
                    type="wait"
                    name="FemaleTech01"
                    version="1.0"
URL="http://127.0.0.1/HoloStation3/Avatars/Scripts/FemaleTech01.ska.hs3"
                    divisor="250"
            }
            gesture {
                    name="FemaleTech01"
                    version="1.0"
URL="http://127.0.0.1/HoloStation3/Avatars/Scripts/FemaleTechska.hs3"
                            menu_name="Wave"
                    divisor="250"
            }
    }
    avatar {
```

-continued

```
        name="FemaleTech02"
        ID="4"
URL="http://127.0.0.1/HoloStation3/Avatars/Models/FemaleTech02.DFF.hs3"
        version="1.0"
        geometry_name ="FemaleTech02.dff"
        geometry_version="1.0"
geometry_URL="http://127.0.0.1/HoloStation3/Avatars/Models/FemaleTech02.DFF.hs3"
        animation {
            type="walk"
            name="FemaleTech02"
            version="1.0"
URL="http://127.0.0.1/HoloStation3/Avatars/Scripts/FemaleTech02.ska.hs3"
            divisor="250"
        }
        animation {
            type="wait"
            name="FemaleTech02"
            version="1.0"
URL="http://127.0.0.1/HoloStation3/Avatars/Scripts/FemaleTech02.ska.hs3"
            divisor="250"
        }
        gesture {
            name="FemaleTech02"
            version="1.0"
URL="http://127.0.0.1/HoloStation3/Avatars/Scripts/FemaleTech02.ska.hs3"
                    menu_name="Wave"
            divisor="250"
        }
}
avatar {
        name="FemaleTech03"
        ID="5"
URL="http://127.0.0.1/HoloStation3/Avatars/Models/FemaleTech03.DFF.hs3"
        version="1.0"
        geometry_name ="FemaleTech03.dff"
        geometry_version="1.0"
geometry_URL="http://127.0.0.1/HoloStation3/Avatars/Models/FemaleTech03.DFF.hs3"
        animation {
            type="walk"
            name="FemaleTech03"
            version="1.0"
URL="http://127.0.0.1/HoloStation3/Avatars/Scripts/FemaleTech03.ska.hs3"
            divisor="250"
        }
        animation {
            type="wait"
            name="FemaleTech03"
            version="1.0"
URL="http://127.0.0.1/HoloStation3/Avatars/Scripts/FemaleTech03.ska.hs3"
            divisor="250"
        }
        gesture {
            name="FemaleTech03"
            version="1.0"
URL="http://127.0.0.1/HoloStation3/Avatars/Scripts/FemaleTech03.ska.hs3"
                    menu_name="Wave"
            divisor="250"
        }
}
avatar {
        name="MaleTech"
        ID="6"
URL"http://127.0.0.1/HoloStation3/Avatars/Models/MaleTech.DFF.hs3"
        version="1.0"
        geometry_name ="MaleTech.dff"
        geometry_version="1.0"
geometry_URL="http://127.0.0.1/HoloStation3/Avatars/Models/MaleTech.DFF.hs3"
        animation {
            type="walk"
            name="MaleTech"
            version="1.0"
URL"http://127.0.0.1/HoloStation3/Avatara/Scripta/MaleTech.ska.hs3"
            divisor="250"
        }
        animation {
            type="wait"
            name="MaleTech"
            version="1.0"
URL="http://127.0.0.1/HoloStation3/Avatars/Scripts/MaleTech.ska.hs3"
```

-continued

```
            divisor="250"
        }
        gesture {
            name="MaleTech"
            version="1.0"
URL="http://127.0.0.1/HoloStation3/Avatars/Scripts/MaleTech.ska.hs3"
                menu_names="Wave"
            divisor="250"
        }
}
avatar {
    name="MaleTech01"
    ID="7"
URL="http://127.0.0.1/HoloStation3/Avatars/Models/MaleTech01.DFF.hs3"
    version="1.0"
    geometry_name = "MaleTech01.dff"
    geometry_version="1.0"
geometry_URL="http://127.0.0.1/HoloStation3/Avatars/Models/MaleTech01.DFF.hs3"
        animation {
            type="walk"
            name="MaleTech01"
            version="1.0"
URL="http://127.0.0.1/HoloStation3/Avatars/Scripts/MaleTech01.ska.hs3"
            divisor="250"
        }
        animation {
            type="wait"
            name="MaleTech01"
            version="1.0"
URL="http://127.0.0.1/HoloStation3/Avatars/Scripts/MaleTech01.ska.hs3"
            divisor="250"
        }
        gesture {
            name="MaleTech01"
            version="1.0"
URL="http://127.0.0.1/HoloStation3/Avatars/Scripts/MaleTech01.ska.hs3"
                menu_name="Wave"
            divisor="250"
        }
}
avatar {
    name="MaleTech02"
    ID="8"
URL="http://127.0.0.1/HoloStation3/Avatars/Models/MaleTech02.DFF.hs3"
    version="1.0"
    geometry_name = "MaleTech02.dff"
    geometry_version="1.0"
geometry_URL="http://127.0.0.1/HoloStation3/Avatars/Models/MaleTech02.DFF.hs3"
        animation {
            type="walk"
            name="MaleTech02"
            version="1.0"
URL="http://127.0.0.1/HoloStation3/Avatars/Scripts/MaleTech02.ska.hs3"
            divisor="250"
        }
        animation {
            type="wait"
            name="MaleTech02"
            version="1.0"
URL="http://127.0.0.1/HoloStation3/Avatars/Scripts/MaleTech02.ska.hs3"
            divisor="250"
        }
        gesture {
            name="MaleTech02"
            version="1.0"
URL="http://127.0.0.1/HoloStation3/Avatars/scripts/MaleTech02.ska.hs3"
                menu_name="Wave"
            divisor="250"
        }
}
avatar {
    name="MaleTech03"
    ID="9"
URL"http://127.0.0.1/HoloStation3/Avatars/Models/MaleTech03.DFF.hs3"
    version="1.0"
    geometry_name ="MaleTech03.dff"
    geometry_version="1.0"
geometry_URL="http://127.0.0.1/HoloStation3/Avatars/Models/MaleTech03.DFF.hs3"
        animation {
```

```
                type="walk"
                name="MaleTech03"
                version="1.0"
    URL="http://127.0.0.1/HoloStation3/Avatars/Scripts/MaleTech03.ska.hs3"
                divisor="250"
            }
            animation {
                type="wait"
                name="MaleTech03"
                version="1.0"
    URL="http://127.0.0.1/HoloStation3/Avatars/Scripts/MaleTech03.ska.hs3"
                divisor="250"
            }
            gesture {
                name="MaleTech03"
                version="1.0"
    URL="http://127.0.0.1/HoloStation3/Avatars/Scripts/MaleTech03.ska.hs3"
                    menu_name="Wave"
                divisor="250"
            }
        }
    }
    scene {
        name="mainScene"
        BSP {
            name="Lobby"
            version="1.0"
    URL="http://127.0.0.1/HoloStation3/LobbyScene/Models/lobby.bsp.hs3"
        }
        model {
            geometry {
                name="elevatorpanel.dff"
                version="1.0"
    URL="http://127.0.0.1/HoloStation3/LobbyScene/Models/elevatorpanel.dff.hs3"
            }
            instance {
                matrix="-1,0,0,0,0,1,0,1,0,2.017,15.133,2.82"
                clickevent {
                    action {
                        type="CReqURLAction"
                        param="E:\Program Files\Apache Group\Apache\htdocs\accenture_standalone\web\lobbyelevator.html"
                        param="hidden"
                    }
                }
            }
        }
        model {
            geometry {
                name="plant.dff"
                version="1.0"
    URL="http://127.0.0.1/HoloStation3/LobbyScene/Models/plant.dff.hs3"
            }
            instance {
                matrix="-1,0,0.0,0,1,0,1,0,-8.155,6.548,2.78"
            }
            instance {
                matrix="-1,0,0,0,0,1,0,1,0,31 5.57,2.238,2.78"
            }
            instance {
                matrix="-1,0,0,0,0,1,0,1,0,5.57,2.238,2.78"
            }
            instance {
                matrix="-1,0,0,0,0,1,0,1,0,8.237,6.548,2.78"
            }
        }
        model {
            geometry {
                name="frontglass.dff"
                version="1.0"
    URL="http://127.0.0.1/HoloStation3/LobbyScene/Models/frontglass.dff.hs3"
            }
            instance {
                matrix="0,0,-1,1,0,0,0,-1,0,0,.750,5.699"
            }
        }
        animatedmodel {
            name="Security Guard"
            model }
                geometry }
```

-continued

```
                name="securityguard.dff"
                version="1.0"
    URL="http://127.0.0.1/HoloStation3/LobbyScene/Models/securityguard.dff.hs3"
            }
            instance {
                matrix="-1,0,0,0,0.1,0,1,0,.040,8.886,2.42"
                bumpevent {
                    distance"5.0"
                    action {
                        type="CSoundAction"
                        param="fguard2.wav"
                    }
                    action {
                        type="CChatAction"
                        param="Security Guard>Hello there, can I help you?"
                    }
                    action {
                        type="CRemoveAllActions"
                    }
                }
            }
        }
        animation {
            type="sequence"
            name="securityguard"
            version="1.0"
    URL="http://127.0.0.1/HoloStation3/LobbyScene/Scripts/securityguard.ska.hs3"
            divisor="800"
        }
    }
}
NLIRespondent {
    name="Security Guard"
    ID="5"
}
NLIRespondent }
    name="Sharon (Recep.)"
    ID="4"
}
NLIRespondent {
    name="Supervisor"
    ID="1"
}
NLIRespondent {
    name="Peer Technician"
    ID="2"
}
chatbutton {
    caption="Training Portal"
    url="E:\Program Files\Apache
Group\Apache\htdocs\accenture_standalone\web\getcatalog.html"
    dest="hidden"
}
startsound="true"
initservletURL="localhost:17319"
triageservletURL="localhost:17319"
startmultiuser="true"
        }
```

Those of ordinary skill in the art will recognize that equivalent building lobby worlds can be constructed using alternative code sets. The purpose of the building lobby world is for the user to learn how to interact with the building lobby security guard in order to obtain access to both the inside terminal (IT) room and the customer suite. Utilizing the NLI window, the user must interact with the security guard to gain access to the IT room. The user introduces himself to the security guard. At step 322, the server system determines the permissible user actions. If the user has previously called the customer identified on the work order to inform the customer the user would be arriving the user's name will appear on the security guard's visitor list. If the user failed to call the customer from the garage world, the user will be allowed to advance to the building lobby world, but will not have access to the IT room or customer suite without further remedial action. The user then calls the customer receptionist to check in, and the receptionist informs the security guard to permit the user access. Alternatively, the security guard may contact the customer receptionist directly.

At step 326, while the user is in the building lobby world, the user may input a question via the natural language interface. At step 328, the NLI engine 114 retrieves the appropriate response from the NLI database 126 utilizing information from the context database 130. At step 330, the server system 104 presents the response to the user at the client 102. At step 332, the action event engine 118 compares user actions with a predetermined set of desired actions stored in the context database. If the user has completed the predetermined set of desired actions required to move to the next world, the server system 104 presents the next world. If not, the server system presents information to the user to help the user perform the desired actions. Such information may take the form of short videos or text. Although a predetermined number of actions must be completed in order for the user to advance to the next world, not all incorrect actions prohibit advancement. Rather, the action event engine 118 will monitor and record incorrect actions which affect the user's future training and interactions in subsequent worlds.

Within the lobby world, there is one avatar that the user can interact with. The security guard, located behind the desk, can be asked questions around what steps need to be taken to complete the tasks in the lobby. "Where is the IT Room?", "Where is the Phone Room?", are examples of the types of questions the user might ask the garage.

Inside the lobby world, the user is tasked with finding out where in the building he needs to perform his punchdown tasks through questioning the security guard. If the user has not called the customer prior to entering the lobby world, the user is required to do so in this world prior to gaining access the IT room world and customer suite world. Failing to complete the above tasks, results in feedback and/or inability to complete tasks in later worlds. If the user does not call the customer, the user will be unable to use the elevator system to gain access to the IT room and customer suite worlds.

Figure 12:
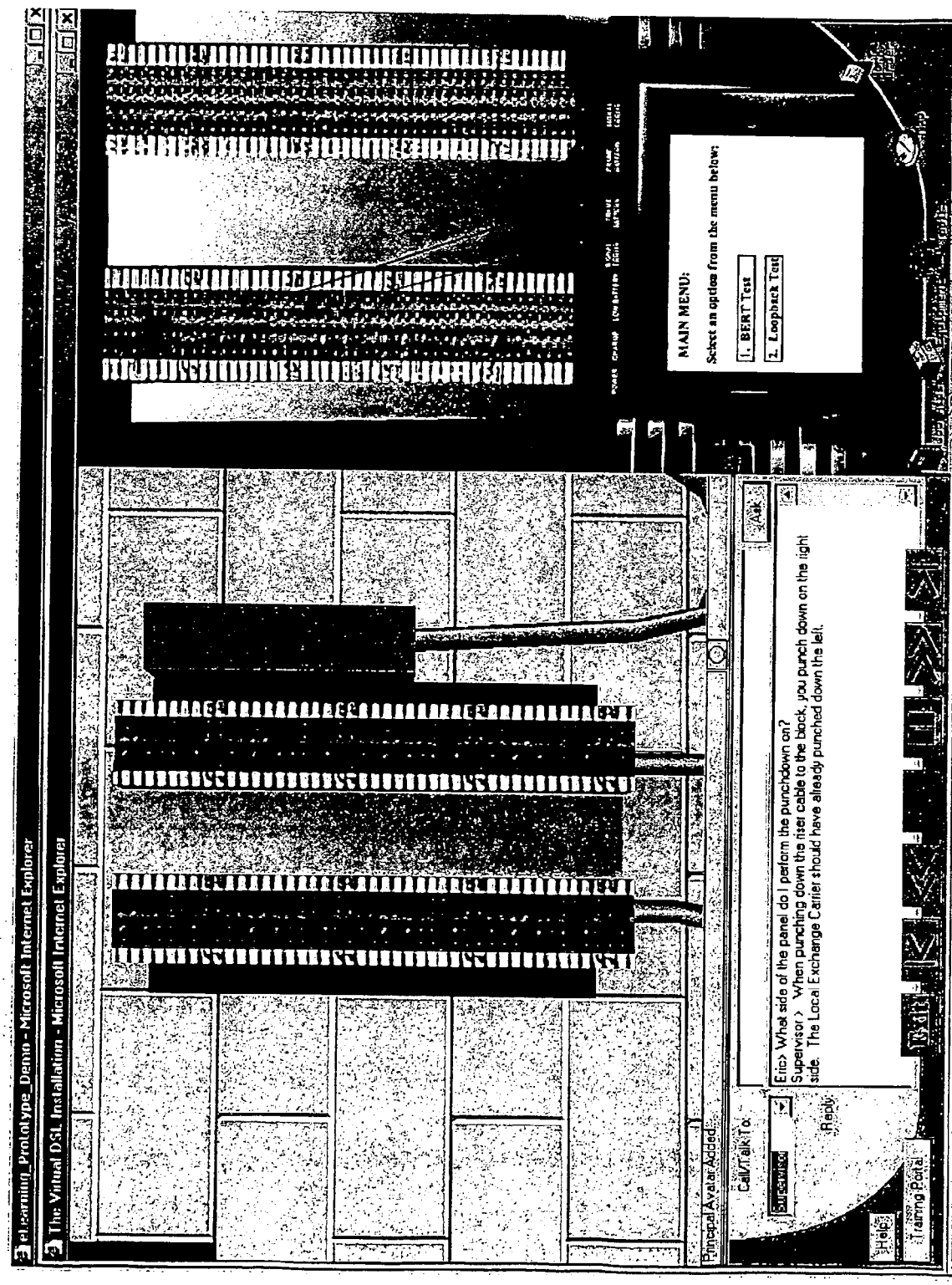
FIG. 12 is a screen shot illustrating a first screen presented to the user performing a punchdown in the inside terminal room world.
Figure 13:
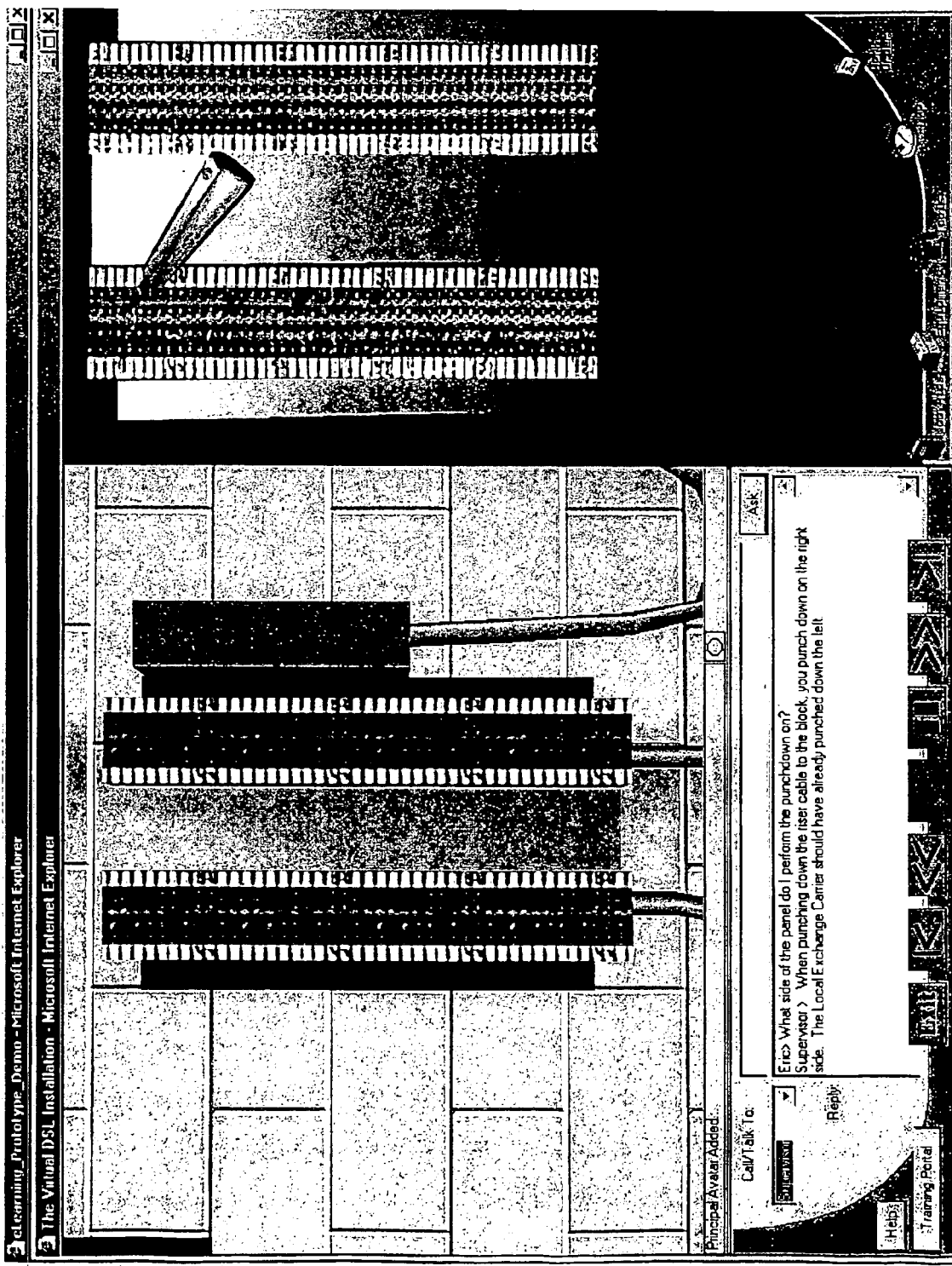
FIG. 13 is a screen shot illustrating a second screen to the user performing a punchdown in the inside terminal room world.
Figure 14:
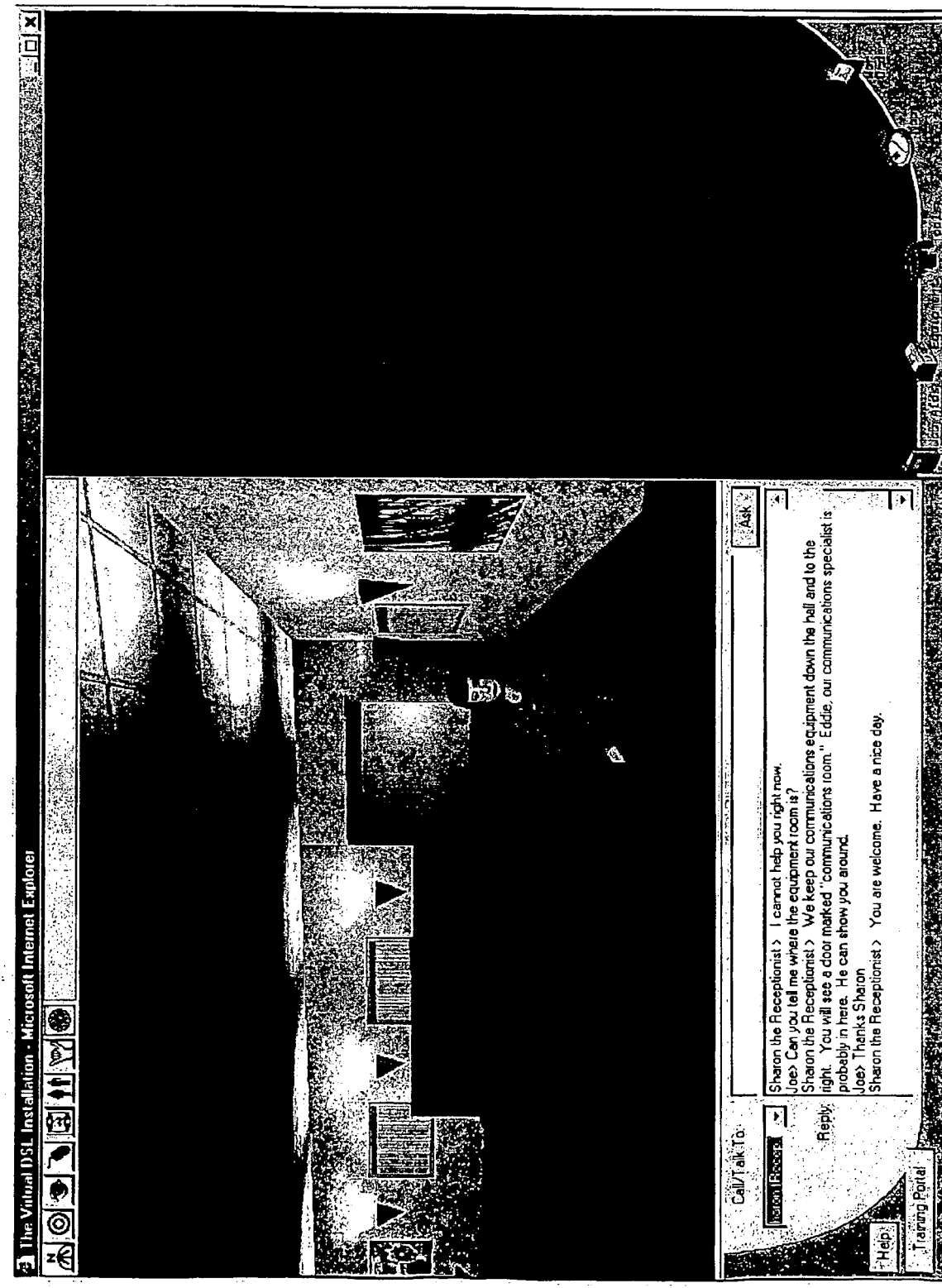
FIG. 14 is a screen shot illustrating the screen presented to the user in the customer suite world.
Figure 15:
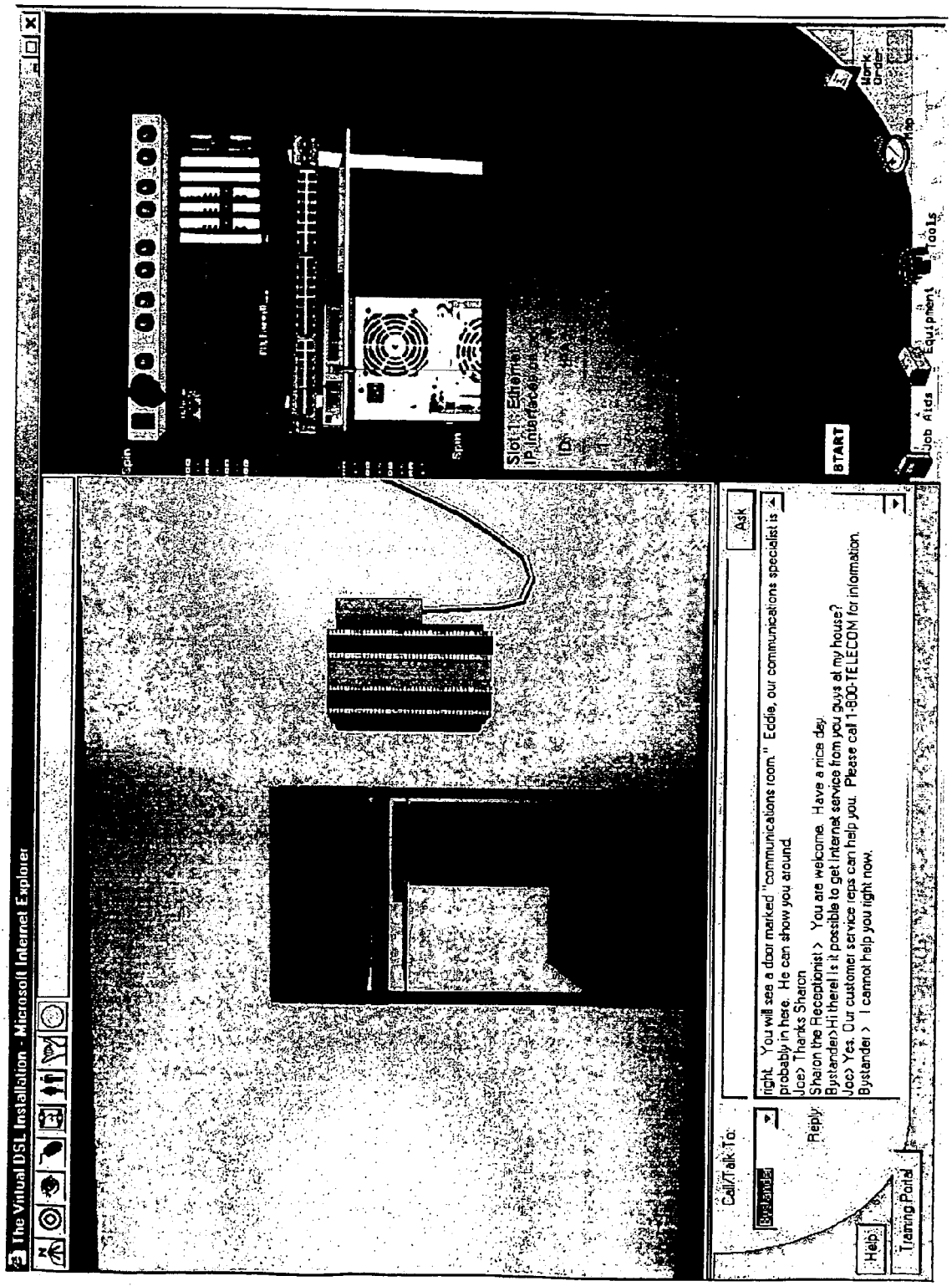
FIG. 15 is a screen shot illustrating the screen presented to the user in the communications equipment room.

At step 336, the server system 304 presents the IT room world to the user at the client computer 102. FIGS. 12 and 13 are screen shots illustrating screens presented to the user while the user is performing a "punchdown" in the IT room world. FIG. 12 is a graphical depiction of a 66-Block, an item that is located in IT rooms. This 66-Block is used by technicians to connect the underground cables coming into the building to the riser cables specific to the company for which the installation is being performed. Also on FIG. 12 is the T-Berd tool, used by technicians to perform tests on incoming pairs located on the 66-Block. FIG. 13 depicts the 66-Block, along with a punchdown tool, used to connect the incoming pairs on the 66-Block to the riser cable pairs. At step 338, the server system 338 retrieves previous user inputs from previous worlds stored in the event database. At step 340, the server system 104 receives and stores inputs by the user in the IT room world. An illustrative IT room is established using the following code:

```
world {
    name="ITRoomScene"
    ID="3"
    description="A test world for script debugging"
    mainURL="http://127.0.0.1/HoloStation3/ITRoom/"
    modelURL="http://127.0.0.1/HoloStation3/ITRoom/Models/"
    textureURL="http://127.0.0.1/HoloStation3/ITRoom/Textures/"
    scriptURL="http://127.0.0.1/HoloStation3/ITRoom/Scripts/"
    mediaURL="http://127.0.0.1./HoloStation3/ITRoom/Media/"
    InitPos="-.866,.500,0,0,0,1,.500,.866,0,-10.5,4.5,.869"
    camera {
        name="eye"
        xOffset="0.2"
        yOffset="1.0"
        zOffset="0.0"
        rotX="0.0"
        rotY="0.0"
        rotZ="0.0"
        active="yes"
    }
    camera {
        name="front"
        xOffset="0"
        yOffset="0.5"
        zOffset="5.0"
        rotX="0.0"
        rotY="180.0"
        rotZ="0.0"
    }
    camera {
        name="back"
        xOffset="0"
        yOffset="0.5"
        zOffset="-3.0"
        rotX="8.0"
        rotY="0.0"
        rotZ="0.0"
    }
    avatar {
        name="FemaleTech"
        ID="2"
    URL="http://127.0.0.1/HoloStation3/Avatar3/Models/FemaleTech.DFF.hs3"
        version="1.0"
        geometry_name = "FemaleTech.dff"
        geometry_version="1.0"
        active="yes"
    geometry_URL="http://127.0.0.1/HoloStation3/Avatars/Models/FemaleTech.DFF.hs3"
        animation {
            type="walk"
            name="FemaleTech"
```

-continued

```
            version="1.0"
    URL="http://127.0.0.1/HoloStation3/Avatars/Scripts/FemaleTech.ska.hs3"
            divisor="250"
        }
        animation {
            type="wait"
            name="FemaleTech"
            version="1.0"
    URL="http://127.0.0.1/HoloStation3/Avatars/Scripts/FemaleTech.ska.hs3"
            divisor="250"
        }
        gesture {
            name="FemaleTech"
            version="1.0"
    URL="http://127.0.0.1/HoloStation3/Avatars/scripts/FemaleTech.ska.hs3"
                    menu_name="Wave"
            divisor="250"
        }
    }
    avatar {
        name="FemaleTech01"
        ID="3"
    URL="http://127.0.0.1/HoloStation3/Avatars/Models/FemaleTech01.DFF.hs3"
        version="1.0"
        geometry_name ="FemaleTech01.dff"
        geometry_version="1.0"
    geometry_URL="http://127.0.0.1/HoloStation3/Avatars/Models/FemaleTech01.DFF.hs3"
        animation {
            type="walk"
            name="FemaleTech01"
            version="1.0"
    URL="http://127.0.0.1/HoloStation3/Avatars/Scripts/FemaleTech01.ska.hs3"
            divisor="250"
        }
        animation {
            type="wait"
            name="FemaleTech01"
            version="1.0"
    URL="http://127.0.0.1/HoloStation3/Avatars/Scripts/FemaleTech01.ska.hs3"
            divisor="250"
        }
        gesture {
            name="FemaleTech01"
            version="1.0"
    URL="http://127.0.0.1/HoloStation3/Avatars/Scripts/FemaleTech.ska.hs3"
                    menu_name="Wave"
            divisor="250"
        }
    }
    avatar {
        name="FemaleTech02"
        ID="4"
    URL="http://127.0.0.1/HoloStation3/Avatars/Models/FemaleTech02.DFF.hs3"
        version="1.0"
        geometry_name ="FemaleTech02.dff"
        geometry_version="1.0"
    geometry_URL="http://127.0.0.1/HoloStation3/Avatars/Models/FemaleTech02.DFF.hs3"
        animation {
            type="walk"
            name="FemaleTech02"
            version="1.0"
    URL="http://127.0.0.1/HoloStation3/Avatars/Scripts/FemaleTech02.ska.hs3"
            divisor="250"
        }
        animation {
            type="wait"
            name="FemaleTech02"
            version="1.0"
    URL="http://127.0.0.1/HoloStation3/Avatars/Scripts/FemaleTech02.ska.hs3"
            divisor="250"
        }
        gesture {
            name="FemaleTech02"
            version="1.0"
    URL="http://127.0.0.1/HoloStation3/Avatars/Scripts/FemaleTech02.ska.hs3"
                    menu_name="Wave"
            divisor="250"
        }
    }
```

-continued

```
avatar {
    name="FemaleTech03"
    ID="5"
URL="http://127.0.0.1/HoloStation3/Avatars/Models/FemaleTech03.DFF.hs3"
    version="1.0"
    geometry_name = "FemaleTech03.dff"
    geometry_version="1.0"
geometry_URL="http://127.0.0.1/HoloStation3/Avatars/Models/FemaleTech03.DFF.hs3"
    animation {
        type="walk"
        name="FemaleTech03"
        version="1.0"
URL="http://127.0.0.1/HoloStation3/Avatars/scripts/FemaleTech03.ska.hs3"
        divisor="250"
    }
    animation {
        type="wait"
        name="FemaleTech03"
        version="1.0"
URL="http://127.0.0.1/HoloStation3/Avatars/Scripts/FemaleTech03.ska.hs3"
        divisor="250"
    }
    gesture {
        name="FemaleTech03"
        version="1.0"
URL="http://127.0.0.1/HoloStation3/Avatars/Scripts/FemaleTech03.ska.hs3"
                menu_name="Wave"
        divisor="250"
    }
}
avatar {
    name="MaleTech"
    ID="6"
URL="http://127.0.0.1/HoloStation3/Avatars/Models,/MaleTechDFF.hs3"
    version="1.0"
    geometry_name = "MaleTech.dff"
    geometry_version="1.0"
geometry_URL="http://127.0.0.1/HoloStation3/Avatars/Models/MaleTech.DFF.hs3"
    animation {
        type="walk"
        name="MaleTech"
        version="1.0"
URL="http://127.0.0.1/HoloStation3/Avatars/Scripts/MaleTech.ska.hs3"
        divisor="250"
    }
    animation {
        type="wait"
        name="MaleTech"
        version="1.0"
URL="http://127.0.0.1/HoloStation3/Avatars/Scripts/MaleTech.ska.hs3"
        divisor="250"
    }
    gesture {
        name="MaleTech"
        version="1.0"
URL="http://127.0.0.1/HoloStation3/Avatars/Scripts/MaleTech.ska.hs3"
                menu_name="Wave"
        divisor="250"
    }
}
avatar {
    name="MaleTech01"
    ID="7"
URL="http://127.0.0.1/HoloStation3/Avatars/Models/MaleTech01.DFF.hs3"
    version="1.0"
    geometry_name = "MaleTech01.dff"
    geometry_version="1.0"
geometry_URL="http://127.0.0.1/HoloStation3/Avatars/Models/MaleTech01.DFF.hs3"
    animation {
        type="walk"
        name="MaleTech01"
        version="1.0"
URL="http://127.0.0.1/HoloStation3/Avatars/Scripts/MaleTech01.ska.hs3"
        divisor="250"
    }
    animation {
        type="wait"
        name="MaleTech01"
        version="1.0"
```

-continued

```
URL="http://127.0.0.1/HoloStation3/Avatars/Scripts/MaleTech01.ska.hs3"
            divisor="250"
        }
        gesture {
            name="MaleTech01"
            version="1.0"
URL="http://127.0.0.1/HoloStation3/Avatars/Scripts/MaleTech01.ska.hs3"
                    menu_name="Wave"
            divisor="250"
        }
}
avatar {
        name="MaleTech02"
        ID="8"
URL="http://127.0.0.1/HoloStation3/Avatars/Models/MaleTech02.DFF.hs3"
        version="1.0"
        geometry_name = "MaleTech02.dff"
        geometry_version="1.0"
geometry_URL="http://127.0.0.1/HoloStation3/Avatars/Models/MaleTech02.DFF.hs3"
        animation {
            type=37 walk"
            name="MaleTech02"
            version="1.0"
URL="http://127.0.0.1/HoloStation3/Avatars/Scripts/MaleTech02.ska.hs3"
            divisor="250"
        }
        animation {
            type="wait"
            name="MaleTech02"
            version="1.0"
URL="http://127.0.0.1/HoloStation3/Avatara/Scripts/MaleTech02.ska.hs3"
            divisor="250"
        }
        gesture {
            name="MaleTech02"
            version="1.0"
URL="http://127.0.0.1/HoloStation3/Avatars/Scripts/MaleTech02.ska.hs3"
                    menu_name="Wave"
            divisor="250"
        }
}
avatar {
        name="MaleTech03"
        ID="9"
URL="http://127.0.0.1/HoloStation3/Avatars/Models/MaleTecho3.DFF.hs3"
        version="1.0"
        geometry_name = "MaleTech03.dff"
        geometry_version="1.0"
geometry_URL="http://127.0.0.1/HoloStation3/Avatars/Models/MaleTech03.DFF.hs3"
        animation {
            type="walk"
            name="MaleTech03"
            version="1.0"
URL="http://127.0.0.1/HoloStation3/Avatars/Scripts/MaleTech03.ska.hs3"
            divisor="250"
        {
        animation {
            type="wait"
            name="MaleTech03"
            version="1.0"
URL="http://127.0.0.1/HoloStation3/Avatars/Scripts/MaleTech03.ska.hs3"
divisor="250"
        }
        gesture {
            name="MaleTech03"
            version="1.0"
URL="http://127.0.0.1/HoloStation3/Avatars/Scripts/MaleTech03.ska.hs3"
                    menu_name="Wave"
            divisor="250"
        }
}
scene {
        name="mainScene"
        BSP {
            name="ITRoom"
            version="1.0"
URL="http://127.0.0.1/HoloStation3/ITRoom/Models/ITRoom.bsp.hs3"
        }
        model {
```

-continued

```
        geometry {
            name="elevatorpanel.dff"
            version="1.0"
    URL="http://127.0.0.1/HoloStation3/ITRoom/Models/elevatorpanel.dff.hs3"
            56
            instance {
                matrix="1,0,0,0,0,1,0,-1,0,-12.706,-.468,1.578"
                clickevent {
                    action {
                        type="CReqURLAction"
                        param="E:\Program Files\Apache
Group\Apache\htdocs\accenture_standalone\web\itroomelevator.html"
                        param="hidden"
                    }
                }
            }
        }
        model {
            geometry {
                name="punchdown.dff"
                version="1.0"
    URL="http://127.0..1/HoloStation3/ITRoom/Models/punchdown.dff.hs3"
            }
            instance {
                matrix="1,0,0,0,1,0,0,0,1,-6.792,-.299,1.398"
                clickevent {
                    action {
                        type="CReqURLAction"
                        param="E:\Program Files\Apache
Group\Apache\htdocs\accenture_standalone\web\itroommovie.html"
                        param="hidden"
                    }
                }
            }
        }
    }
    NLIRespondent {
        name="Supervisor"
        ID="1"
    }
    NLIRespondent {
        name="Peer Technician"
        ID="2"
    }
    NLIRespondent {
        name="Bonnie (CSR)"
        ID="3"
    }
    NLIRespondent {
        name="Security Guard"
        ID="5"
    }
    {
    chatbutton {
        caption="Training Portal"
        url="E:\Program Files\Apache
Group\Apache\htdocs\accenture_standalone\web\getcatalog.html"
        dest="hidden"
    }
    startsound="true"
    initservletURL="localhost:17319"
    triageservletURL="localhost:17319"
    startmultiuser="true"
        }
```

Those of ordinary skill in the art will recognize that equivalent IT room worlds can be constructed using alternative code sets. The purpose of the IT room world is for the user to simulate performing a punch-down. The user accesses the user toolbar and click on tools to select the appropriate tool there. That tool would then be presented to you on the screen and you would use your mouse, arrow, whatever, click on it. The user would then drag it up to the appropriate place on the cross box where the tool is to be used.

A large cable running from the central office to the building terminates at the inside terminal room. The cable is the conduit for all of the communications lines servicing the entire building. The user performs a "punch down" within the inside terminal room. A punch down comprises cross-connecting the cables that are coming in from the central office to the cables that are going up in the building. These cables are known as riser cables, and are essentially vertical cables that move from the basement to the first floor or to the second floor or to the third floor, etc. The user connects the appropriate pairs of cables. Following the connection process, the user performs a test to ensure that the appropriate pairs of cables have been connected and a test to ensure that the cables that have been connected are able to support the level of service that is required of the work order. At this step in the process, the user selects the T-Berd test set from their equipment box icon to test for the appropriate signal and verify that they have located the correct incoming pair of wires as specified on the work order. Once the correct set of wires have been located, the user proceeds with the activity by selecting their punchdown tool from their toolset and extending the appropriate wires to the customer suite. For example, a pair that has old copper wire could easily support phone service but not support a DSL line of data service so the user may be required to replace that copper wire with simply a new copper wire.

At step 342, user actions are compared with the desired IT room actions. At step 356, if the user did not perform the correct installation, the server system presents a responsive video to the user. This video may be a "war story" (as termed by the inventor) by a former technician describing the consequences of performing such an incorrect action. In the IT room worlds, when a user connects the wrong cables, the user receives immediate feedback in the form of a video war story. For example, a small 3" by 3" video pops up of a technician telling the user about an assignment in which the technician did not appropriately test to ensure that he was connecting the right pairs which resulted in a great amount of deal of rework for him and to have fellow technicians to actually diagnose the problem. As in other worlds, the user may input a question via the natural language interface. The NLI engine 114 retrieves the appropriate response from the NLI database 126 utilizing information from the context database 130, which is then presented to the user at the client 102. If the user has completed the predetermined set of desired actions required to move to the next world, the server system 104 presents the next world.

At step 336, the server system 304 presents the customer suite world to the user at the client computer 102. FIG. 13 is a screen shot illustrating the screen presented to the user in the customer suite world. At step 352, the server system 338 retrieves previous user inputs from previous worlds stored in the event database. At step 354, the server system 104 receives and stores inputs by the user in the customer suite world. An illustrative customer suite is established using the following code:

```
world
    name="CustomerScene"
    ID="2"
    description="A test world for script debugging"
    mainURL="http://127.0.0.1/HoloStation3/"
    modelURL="http://127.0.0.1/HoloStation3/CustomerSuite/Models/"
    textureURL="http://127.0.0.1/HoloStation3/CustomerSuite/Textures/"
    scriptURL="http://127.0.0.1/HoloStation3/CustomerSuite/Scripts/"
    mediaURL="http://127.0.0.1/HoloStation3/CustomerSuite/Media/"
    InitPos="-1,0,0,0,0,1,0,1,0,15,-.2,1.0"
    camera {
        name="eye"
        xOffset="0.2"
        yOffset="1.0"
        zOffset="0.0"
        rotX="0.0"
        rotY="0.0"
        rotZ="0.0"
        active="yes"
    }
    camera {
        name="front"
        xOffset="0"
        yOffset="0.5"
        zOffset="5.0"
        rotX="0.0"
        rotY="180.0"
        rotZ="0.0"
    }
    camera {
        name="back"
        xOffset="0"
        yOffset="0.5"
        zOffset="-3.0"
        rotX="8.0"
        rotY="0.0"
        rotZ="0.0"
    }
    avatar {
        name="FemaleTech"
        ID="2"
    URL="http://127.0.0.1/HoloStation3/Avatars/Models/FemaleTech.DFF.hs3"
        version="1.0"
        geometry_name = "FemaleTech.dff"
        geometry_version="1.0"
        active="yes"
    geometry_URL="http://127.0.0.1/HoloStation3/Avatars/Models/FemaleTech.DFF.hs3"
        animation {
            type="Walk"
            name="FemaleTech"
            version="1.0"
```

-continued

```
URL="http://127.0.0.1/HoloStation3/Avatars/Scripts/FemaleTech.ska.hs3"
        divisor="250"
    }
    animation {
        type="wait"
        name="FemaleTech"
        version="1.0"
URL="http://127.0.0.1/HoloStation3/Avatars/Scripts/FemaleTech.ska.hs3"
        divisor="250"
    }
    gesture {
        name="FemaleTech"
        version="1.0"
URL="http://127.0.0.1/HoloStation3/Avatars/Scripts/FemaleTech.ska.hs3"
                menu_name="Wave"
        divisor="250"
    }
}
avatar {
    name="FemaleTech01"
    ID="3"
URL"http://127.0.0.1/HoloStation3/Avatars/Models/FemaleTech01.DFF.hs3"
    version="1.0"
    geometry_name = "FemaleTech01.dff"
    geometry_version="1.0"
qeometry_URL="http://127.0.0.1/HoloStation3/Avatars/Models/FemaleTech01.DFF.hs3"
    animation {
        type="walk"
        name="FemaleTech01"
        version="1.0"
URL="http://127.0.0.1/HoloStation3/Avatars/Scripts/FernaleTech01.ska.hs3"
        divisor="250"
    }
    animation {
        type="wait"
        name="FemaleTech01"
        version="1.0"
URL="http://127.0.0.1/HoloStation3/Avatars/Scripts/FemaleTech01.ska.hs3"
        divisor="250"
    }
    gesture {
        name="FemaleTech01"
        version="1.0"
URL="http://127.0.0.1/HoloStation3/Avatars/Scripts/FemaleTech.ska.hs3"
                menu_name="Wave"
        divisor="250"
    }
}
avatar {
    name="FemaleTech02"
    ID="4"
URL="http://127.0.0.1/HoloStation3/Avatars/Models/FemaleTech02.DFF.hs3"
    version="1.0"
    geometry_name = "FemaleTech02.dff"
    geometry_version="1.0"
geometry_URL="http://127.0.0.1/HoloStation3/Avatars/Models/FemaleTech02.DFF.hs3"
    animation {
        type="walk"
        name="FemaleTech02"
        version="1.0"
URL="http://127.0.0.1/HoloStation3/Avatars/Scripts/FemaleTech02.ska.hs3"
        divisor="250"
    }
    animation {
        type="wait"
        name="FemaleTech02"
        version="1.0"
URL="http://127.0.0.1/HoloStation3/Avatars/Scripts/FemaleTech02.ska.hs3"
        divisor="250"
    }
    gesture {
        name="FemaleTech02"
        version="1.0"
URL="http://127.0.0.1/HoloStation3/Avatars/Scripts/FemaleTech02.ska.hs3"
                menu_name="Wave"
        divisor="250"
    }
}
avatar {
```

-continued

```
        name="FemaleTech03"
        ID="5"
URL="http://127.0.0.1/HoloStation3/Avatar5/Models/FemaleTech03.DFF.hs3"
        version="1.0"
        geometry_name = "FemaleTech03.dff"
        geometry_version="1.0"
geometry_URL="http://127.0.0.1/HoloStation3/Avatars/Models/FemaleTech03.DFF.hs3"
        animation {
            type="walk"
            name="FemaleTech03"
            version="1.0"
URL="http://127.0.0.1/HoloStation3/Avatars/Scripts/FemaleTech03.ska.hs3"
            divisor="250"
        }
        animation {
            type="wait"
            name="FemaleTech03"
            version="1.0"
URL="http://127.0.0.1/HoloStation3/Avatars/Scripts/FemaleTech03.ska.hs3"
            divisor="250"
        }
        gesture {
            name="FemaleTech03"
            version="1.0"
URL="http://127.0.0.1/HoloStation3/Avatars/Scripts/FemaleTech03.ska.hs3"
                    menu_name="Wave"
            divisor="250"
        }
}
avatar {
        name="MaleTech"
        ID="6"
URL="http://127.0.0.1/HoloStation3/Avatars/Models/MaleTech.DFF.hs3"
        version="1.0"
        geometry_name ="MaleTech.dff"
        geometry_version="1.0"
geometry_URL="http://127.0.0.1/HoloStation3/Avatars/Models/MaleTech.DFF.hs3"
        animation {
            type="walk"
            name="MaleTech"
            version="1.0"
URL="http://127.0.0.1/HoloStation3/Avatars/Scripts/MaleTech.ska.hs3"
            divisor="250"
        }
        animation {
            type="wait"
            name="MaleTech"
            version="1.0"
URL="http://127.0.0.1/HoloStation3/Avatars/Scripts/MaleTech.ska.hs3"
            divisor="250"
        }
        gesture {
            name="MaleTech"
            version="1.0"
URL="http://127.0.0.1/HoloStation3/Avatars/Scripts/MaleTech.ska.hs3"
                    menu_name="Wave"
            divisor="250"
        }
}
avatar {
        name="MaleTech01"
        ID="7"
URL="http://127.0.0.1/HoloStation3/Avatars/Models/MaleTech01.DFF.hs3"
        version="1.0"
        geometry_name = "MaleTech01.dff"
        geometry_version="1.0"
geometry_URL="http://127.0.0.1/HoloStation3/Avatars/Models/MaleTech01.DFF.hs3"
        animation {
            type="walk"
            name="MaleTech01"
            version="1.0"
URL="http://127.0.0.1/HoloStation3/Avatars/Scripts/MaleTech01.ska.hs3"
            divisor="250"
        }
        animation {
            type="wait"
            name="MaleTech01"
            version="1.0"
URL="http://127.0.0.1/HoloStation3/Avatars/Scripts/MaleTech01.ska.hs3"
```

-continued

```
            divisor="250"
        }
        gesture {
            name="MaleTech01"
            version="1.0"
URL="http://127.0.0.1/HoloStation3/Avatars/Scripts/MaleTech01.ska.hs3"
            menu_name="Wave"
            divisor="250"
        }
}
avatar {
    name="MaleTech02"
    ID="8"
URL="http://127.0.0.1/HoloStation3/Avatars/Models/MaleTech02.DFF.hs3"
    version="1.0"
    geometry_name = "MaleTech02.dff"
    geometry_version="1.0"
geometry_URL="http://127.0.0.1/HoloStation3/Avatars/Models/MaleTech02.DFF.hs3"
        animation {
            type="walk"
            name="MaleTech02"
            version="1.0"
URL="http://127.0.0.1/HoloStation3/Avatars/Scripts/MaleTech02.ska.hs3"
            divisor="250"
        }
        animation {
            type="wait"
            name="MaleTech02"
            version="1.0"
URL="http://127.0.0.1/HoloStation3/Avatars/Scripts/MaleTech02.ska.hs3"
            divisor×"250"
        }
        gesture {
            name="MaleTech02"
            version="1.0"
URL="http://127.0.0.1/HoloStation3/Avatars/Scripts/MaleTech02.ska.hs3"
            menu_name="Wave"
            divisor="250"
        }
}
avatar {
    name="MaleTech03"
    ID="9"
URL="http://127.0.0.1/HoloStation3/Avatars/Models/MaleTech03.DFF.hs3"
    version="1.0"
    geometry_name = "MaleTech03.dff"
    geometry_version="1.0"
geometry_URL="http://127.0.0.1/HoloStation3/Avatars/Models/MaleTech03.DFF.hs3"
        animation {
            type="walk"
            name="MaleTech03"
            version="1.0"
URL="http://127.0.0.1/HoloStation3/Avatars/Scripts/MaleTech03.ska.hs3"
            divisor="250"
        }
        animation {
            type="wait"
            name="MaleTech03"
            version="1.0"
URL="http://127.0.0.1/HoloStation3/Avatars/Scripts/MaleTech03.ska.hs3"
            divisor="250"
        }
        gesture {
            name="MaleTech03"
            version="1.0"
URL="http://127.0.0.1/HoloStation3/Avatars/Scripts/MaleTech03.ska.hs3"
            menu_name="Wave"
            divisor="250"
        }
}
scene {
    name="mainScene"
    BSP {
        name="Customer"
        version="1.0"
URL="http://127.0.0.1/HoloStation3/CustomerSuite/Models/customer.bsp.hs3"
    }
    animatedmodel {
        name="Sharon Smith"
```

-continued

```
        model {
            geometry {
                name="sharonsmith.dff"
                version="1.0"
URL="http://127.0.0.1/HoloStation3/CustomerSuite/Models/sharonsmith.dff.hs3"
            }
            instance {
                matrix="−.707,−.707,0,0,0,1,−.707,.707,0,8.4,1.42,0.96"
                bumpevent {
                    distance="3.0"
                    action {
                        type="CSoundAction"
                        param="fsharon.wav"
                    }
                    action {
                        type="CChatAction"
                        param="Sharon>Hi there! You must be the technician from telecom.com, I am Sharon Smith."
                    }
                    action {
                        type="CRemoveAllActions"
                    }
                }
            }
        }
        animation {
            type="sequence"
            name="sharonsmith"
            version="1.0"
URL="http://127.0.0.1/HoloStation3/CustomerSuite/Scripts/sharonsmith.ska.hs3"
            divisor="1000"
        }
    }
    animatedmodel {
        name="Molly McDonald"
        model {
            geometry {
                name="bystander.dff"
                version="1.0"
URL="http://127.0.0.1/HoloStation3/CustomerSuite/Models/bystander.dff.hs3"
            }
            instance {
                matrix="−.174,.985,0,0,0,1,.985,.174,0,14.55,12.5,1.14"
            }
        }
        animation {
            type="gesture"
            name="bystander"
            version="1.0"
URL="http://127.0.0.1/HoloStation3/CustomerSuite/Scripts/bystander.ska.hs3"
            divisor="1000"
        }
    }
    animatedmodel {
        name="Eddie"
        model {
            geometry {
                name="eddie.dff"
                version="1.0"
URL="http://127.0.0.1/HoloStation3/CustomerSuite/Models/eddie.dff.hs3"
            }
            instance {
                matrix=".866,−.500,0,0,0,1,−.500,−.866,0,16.25,13,.92"
            }
        }
        animation {
            type="sequence"
            name="eddie"
            version="1.0"
URL="http://127.0.0.1/HoloStation3/CustomerSuite/Scripts/eddie.ska.hs3"
            divisor="1000"
        }
    }
    model {
        geometry {
            name="rack.dff"
            version="1.0"
URL="http://127.0.0.1/HoloStation3/CustomerSuite/Models/rack.dff.hs3"
        }
        instance {
```

-continued

```
                matrix="0,-1,0,1,0,0,0,0,1,19.044,10.537,1.1"
                clickevent {
                    action {
                        type="CReqURLAction"
                        param="E:\Program Files\Apache
Group\Apache\htdocs\accenture_standalone\web\customersuitemovie.html"
                        param="hidden"
                    }
                }
                bumpevent {
                    distance="3.0"
                    action {
                        type="CDoGesture"
                        param="Molly McDonald"
                        param="bystander"
                    }
                    action {
                        type="CSoundAction"
                        param="fbystand.wav"
                    }
                    action {
                        type="CChatAction"
                        param="Bystander>Hi there! Is it possible to get Internet service from you guys at my house?"
                    }
                    action {
                        type="CRemoveAllActions"
                    }
                }
            }
        }
        model {
            geometry {
                name="computer.dff"
                version="1.0"
    URL="http://127.0.0.1/HoloStation3/CustomerSuite/Models/computer.dff.hs3"
            }
            instance {
                matrix=".866,-.500,0,.500,.866,0,0,0,1,15.491,13.829,1.016"
                clickeverit {
                    action {
                        type="CReqURLAction"
                        param="E:\Program Files\Apache
Group\Apache\htdocs\accenture_standalone\web\pingmovie.html"
                        param="hidden"
                    }
                }
            }
        }
        model {
            geometry {
                name="phoneroomdoor.dff"
                version="1.0"
    URL="http://127.0.0.1/HoloStation3/CustomerSuite/Models/phoneroom door.dff.hs3"
            }
            instance {
                matrix="0,-1,0,0,0,-1,1,0,0,16,-5,1.5"
                clickevent {
                    action {
                        type="CReqURLAction"
                        param="E:\Program Files\Apache
Group\Apache\htdocs\accenture_standalone\web\exitcstophoneroom.html"
                        param="hidden"
                    }
                }
            }
        }
        model {
            geometry {
                name="elevatorpanel.dff"
                version="1.0"
    URL="http://127.0.0.1/HoloStation3/CustomerSuite/Models/elevatorpanel.dff.hs3"
            }
            instance {
                matrix="0,1,0,0,0,-1,0,0,15.992,-2.475,1.5"
                clickevent {
                    action {
                        type="CReqURLAction"
                        param="E:\Program Files\Apache
Group\Apache\htdocs\accenture_standalone\web\exitcustomersuite.html"
```

```
                param="hidden"
                }
            }
        }
    }
}
NLIRespondent {
    name="Sharon (Recep.)"
    ID="4"
{
NLIRespondent {
    namex"Supervisor"
    ID="1"
}
NLIRespondent {
    name="Peer Technician"
    ID="2"
}
NLIRespondent {
    name="Eddie (IT Spec.)"
    ID="7"
}
NLIRespondent {
    name="Bystander"
    ID="6"
}
chatbutton {
    caption="Training Portal"
    url="E:\Prograrn Files\Apache Group\Apache\htdocs\accenture_standalone\web\getcatalog.html"
    dest="hidden"
}
startsound="true"
initservletURL="localhost:17319"
triageservletuRL="localhost:17319"
startmultiuser="true"
        }
```

Those of ordinary skill in the art will recognize that equivalent customer suite worlds can be constructed using alternative code sets. The purpose of the customer suite world is for the user to learn how to interact with the receptionist at the customer suite in order to gain access to the customer suite equipment room. A text based interaction utilizing the natural language interface is used to obtain instructions to the customer suite equipment world. Within the customer suite world, the user proceeds to navigate towards the customer suite equipment world after speaking with and obtaining permission from the receptionist avatar.

At step 356, while the user is in the customer suite world, the user may input a question via the natural language interface. At step 358, the NLI engine 114 retrieves the appropriate response from the NLI database 126 utilizing information from the context database 130. At step 360, the server system 104 presents the response to the user at the client 102. At step 362, the action event engine 118 compares user actions with a predetermined set of desired actions stored in the context database. If the user has completed the predetermined set of desired actions required to move to the next world, the server system 104 presents the next world. If not, the server system presents information to the user to help the user perform the desired actions. Such information may take the form of short videos or text. Although a predetermined number of actions must be completed in order for the user to advance to the next world, not all incorrect actions prohibit advancement. Rather, the action event engine 118 will monitor and record incorrect actions which affect the user's future training and interactions in subsequent worlds.

At step 366, the server system 304 presents the Communications equipment room world to the user at the client computer 102. FIG. 13 is a screen shot illustrating the screen presented to the user in the Communications equipment room world. At step 368, the server system 104 retrieves previous user inputs from previous worlds stored in the event database. At step 370, the server system 104 receives and stores inputs by the user in the Communications equipment room world. An illustrative communications equipment room world is established using the following code:

```
world {
    name="PhoneRoom"
    ID="6"
    description="A test world for script debugging"
    mainURL="http://127.0.0.1/HoloStation3/PhoneRoom"
    modelURL="http://127.0.0.1/HoloStation3/PhoneRoom/Models/"
    textureURL="http://127.0.0.1/HoloStation3/PhoneRoom/Textures/"
    scriptURL="http://127.0.0.1/HoloStation3/PhoneRoom/Scripts/"
```

-continued

```
    mediaURL="http://127.0.0.1/HoloStation3/PhoneRoom/Media/"
    InitPos="0,1,0,0,0,1,1,0,0,-3.8,2,.9"
    camera {
        name="eye"
        xOffset="0.2"
        yOffset="1.0"
        zOffset="0.0"
        rotX="0.0"
        rotY="0.0"
        rotZ="0.0"
        active="yes"
    }
    camera {
        name="front"
        xOffset="0"
        yOffset="0.5"
        zOffset="5.0"
        rotX="0.0"
        rotY="180.0"
        rotZ="0.0"
    }
    camera {
        name="back"
        xOffset="0"
        yOffset="0.5"
        zOffset="-3.0"
        rotX="8.0"
        rotY="0.0"
        rotZ="0.0"
    }
    avatar {
        name="FemaleTech"
        ID="2"
    URL="http://127.0.0.1/HoloStation3/Avatars/Models/FemaleTech.DFF.hs3"
        version="1.0"
        geometry_name = "FemaleTech.dff"
        geometry_version="1.0"
        active="yes"
    geometry_URL="http://127.0.0.1/HoloStation3/Avatars/Models/FemaleTech.DFF.hs3"
        animation {
            type="walk"
            name="FemaleTech"
            version="1.0"
    URL="http://127.0.0.1/HoloStation3/Avatars/Scripts/FemaleTech.ska.hs3"
            divisor="250"
        }
        animation {
            type="wait"
            name="FemaleTech"
            version="1.0"
    URL="http://127.0.0.1/HoloStation3/Avatars/Scripts/FemaleTech.ska.hs3"
            divisor="250"
        }
        gesture {
            name="FemaleTech"
            version="1.0"
    URL="http://127.0.0.1/HoloStation3/Avatars/Scripts/FemaleTech.ska.hs3"
                menu_name="Wave"
            divisor="250"
        }
    }
    avatar {
        name="FemaleTech01"
        ID="3"
    URL="http://127.0.0.1/HoloStation3/Avatars/Models/FemaleTech01.DFF.hs3"
        version="1.0"
        geometry_name = "FemaleTech01.dff"
        geometry_version="1.0"
    geometry_URL="http://127.0.0.1/HoloStation3/Avatars/Models/FemaleTech01.DFF.hs3"
        animation {
            type="walk"
            name="FemaleTech01"
```

-continued

```
            version"1.0"
    URL="http://127.0.0.1/HoloStation3/Avatars/Scripts/FemaleTech01.ska.hs3"
            divisor="250"
        }
        animation {
            type="wait"
            name="FemaleTech01"
            version="1.0"
    URL="http://127.0.0.1/HoloStation3/Avatars/Scripts/FemaleTech01.ska.hs3"
            divisor="250"
        }
        gesture {
            name="FemaleTech01"
            version="1.0"
    URL="http://127.0.0.1/HoloStation3/Avatars/Scripts/FemaleTech.ska.hs3"
            menu_name="Wave"
            divisor="250"
        }
    }
    avatar {
        name="FemaleTech02"
        ID="4"
    URL="http://127.0.0.1/HoloStation3/Avatars/Models/FemaleTech02.DFF.hs3"
        version="1.0"
        geometry_name = "FemaleTech02.dff"
        geometry_version="1.0"
    geometry_URL="http://127.0.0.1/HoloStation3/Avatars/Models/Female/Tech02.DFF.hs3"
        animation {
            type="walk"
            name="FemaleTech02"
            version="1.0"
    URL="http://127.0.0.1/HoloStation3/Avatars/Scripts/FemaleTech02.ska.hs3"
            divisor="250"
        }
        animation {
            type="wait"
            name="FemaleTech02"
            version="1.0"
    URL="http://127.0.0.1/HoloStation3/Avatars/Scripts/FemaleTech02.ska.hs3"
            divisor="250"
        }
        gesture {
            name="FemaleTech02"
            version="1.0"
    URL="http://127.0.0.1/HoloStation3/Avatars/Scripts/FemaleTech02.ska.hs3"
            menu_name="Wave"
            divisor="250"
        }
    }
    avatar {
        name="FemaleTech03"
        ID="5"
    URL="http://127.0.0.1/HoloStation3/Avatars/Models/FemaleTech03.DFF.hs3"
        version="1.0"
        geometry_name = "FemaleTech03.dff"
        geometry_version="1.0"
    geometry_URL="http://127.0.0.1/HoloStation3/Avatars/Models/FemaleTech03.DFF.hs3"
        animation {
            type="walk"
            name="FemaleTech03"
            version="1.0"
    URL="http://127.0.0.1/HoloStation3/Avatars/Scripts/FemaleTech03.ska.hs3"
            divisor="250"
        }
        animation {
            type="wait"
            name="FemaleTech03"
            version="1.0"
```

-continued

```
    URL="http://127.0.0.1/HoloStation3/Avatars/Scripts/FemaleTech03.ska.hs3"
            divisor="250"
        }
        gesture {
            name="FemaleTech03"
            version="1.0"
    URL="http://127.0.0.1/HoloStation3/Avatars/Scripts/FemaleTech03.ska.hs3"
                menu_name="Wave"
            divisor="250"
        }
    }
    avatar {
        name="MaleTech"
        ID="6"
    URL="http://127.0.0.1/HoloStation3/Avatars/Models/MaleTech.DFF.hs3"
        version="1.0"
        geometry_name = "MaleTech.dff"
        geometry_version="1.0"
    geometry_URL="http://127.0.0.1/HoloStation3/Avatars/Models/MaleTech.DFF.hs3"
        animation {
            type="walk"
            name="MaleTech"
            version="1.0"
    URL="http://127.0.0.1/HoloStation3/Avatars/Scripts/MaleTech.ska.hs3"
            divisor="250"
        }
        animation {
            type="wait"
            name="MaleTech"
            version="1.0"
    URL="http://127.0.0.1/HoloStation3/Avatars/Scripts/MaleTech.ska.hs3"
            divisor="250"
        }
        gesture {
            name="MaleTech"
            version="1.0"
    URL="http://127.0.0.1/HoloStation3/Avatars/Scripts/MaleTech01.ska.hs3"
                menu_name="Wave"
            divisor="250"
        }
    }
    avatar {
        name="MaleTech01"
        ID="7"
    URL="http://127.0.0.1/HoloStation3/Avatars/Models/MaleTech01.DFF.hs3"
        version="1.0"
        geometry_name = "MaleTech01.dff"
        geometry_version="1.0"
    geometry_URL="http://127.0.0.1/HoloStation3/Avatars/Models/MaleTech01.DFF.hs3"
        animation {
            type="walk"
            name="MaleTech01"
            version="1.0"
    URL="http://127.0.0.1/HoloStation3/Avatars/Scripts/MaleTech01.ska.hs3"
            divisor="250"
        }
        animation {
        type="wait"
        name="MaleTech01"
        version="1.0"
    URL="http://127.0.0.1/HoloStation3/Avatars/Scripts/MaleTech01.ska.hs3"
            divisor="250"
        }
        gesture {
            name="MaleTech01"
            version="1.0"
    URL="http://127.0.0.1/HoloStation3/Avatars/Scripts/MaleTech01.ska.hs3"
```

-continued

```
                menu_name="Wave"
                divisor="250"
            }
        }
    }
    avatar {
        name="MaleTech02"
        ID="8"
    URL="http://127.0.0.1/HoloStation3/Avatars/Models/MaleTech02.DFF.hs3"
        version="1.0"
        geometry_name = "MaleTech02.dff"
        geometry_version="1.0"
    geometry_URL="http://127.0.0.1/HoloStation3/Avatars/Models/MaleTech02.DFF.hs3"
        animation {
            type="walk"
            name="MaleTech02"
            version="1.0"
    URL="http://127.0.0.1/HoloStation3/Avatars/Scripts/MaleTech02.ska.hs3"
            divisor="250"
        }
        animation {
            type="wait"
            name="MaleTech02"
            version="1.0"
    URL="http://127.0.0.1/HoloStation3/Avatars/Scripts/MaleTech02.ska.hs3"
            divisor="250"
        }
        gesture {
            name="MaleTech02"
            version="1.0"
    URL="http://127.0.0.1/HoloStation3/Avatars/Scripts/MaleTech02.ska.hs3"
                menu_name="Wave"
                divisor="250"
        }
    }
    avatar {
        name="MaleTech03"
        ID="9"
    URL="http://127.0.0.1/HoloStation3/Avatars/Models/MaleTech03.DFF.hs3"
        version="1.0"
        geometry_name = "MaleTech03.dff"
        geometry_version="1.0"
    geometry_URL="http://127.0.0.1/HoloStation3/Avatars/Models/MaleTech03.DFF.hs3"
        animation {
            type="walk"
            name="MaleTech03"
            version="1.0"
    URL="http://127.0.0.1/HoloStation3/Avatars/Scripts/MaleTech03.ska.hs3"
            divisor="250"
        }
        animation {
            type="wait"
            name="MaleTech03"
            version="1.0"
    URL="http://127.0.0.1/HoloStation3/Avatars/Scripts/MaleTech03.ska.hs3"
            divisor="250"
        }
        gesture {
            name="MaleTech03"
            version="1.0"
    URL="http://127.0.0.1/HoloStation3/Avatars/Scripts/MaleTech03.ska.hs3"
                menu_name="Wave"
                divisor="250"
        }
    }
    scene {
        name="mainScene"
        BSP {
            name="PhoneRoom"
            version="1.0"
```

-continued

```
    URL="http://127.0.0.1/HoloStation3/PhoneRoom/Models/PhoneRoom.bsp
.hs3"
        }
        model {
            geometry {
                name="door.dff"
                version="1.0"
    URL="http://127.0.0.1/HoloStation3/PhoneRoom/Models/door.dff.hs3"
            }
            instance {
                matrix="0,-1,0,0,0,1,-1,0,0,-5.051,2.997,1.5"
                clickevent {
                    action {
                        type="CReqURLAction"
                        param="E:\Program Files\Apache
Group\Apache\htdocs\accenture_standalone\web\exitphoneroomtocs.html"
                        param="hidden"
                    }
                }
            }
        }
        model {
            geometry {
                name="PunchdownBlock.dff"
                version="1.0"
    URL="http://127.0.0.1/HoloStation3/PhoneRoom/Models/PunchdownBloc
k.dff.hs3"
            }
            instance {
                matrix="0,-1,0,-1,0,0,0,0,-1,3.775,1.558,1.398"
                clickevent {
                    action {
                        type="CReqURLAction"
                        param="E:\Program Files\Apache
Group\Apache\htdocs\accenture_standalone\web\phoneroommovie.html"
                        param="hidden"
                    }
                }
            }
        }
    }
    NLIRespondent {
        name="Supervisor"
        ID="1"
    }
    NLIRespondent {
        name="Peer Technician"
        ID="2"
    }
    NLIRespondent {
        name="Bonnie (CSR)"
        ID="3"
    }
    NLIRespondent {
        name="Security Guard"
        ID="5"
    }
    chatbutton {
        caption="Training Portal"
        url="http://127.0.0.1/accenture/web/getcatalog.html"
        dest="hidden"
    }
    startsound="true"
    initservletURL="localhost:17319"
    triageservletURL="localhost:17319"
    startmultiuser="true"
        }
```

Those of ordinary skill in the art will recognize that equivalent Communications equipment room worlds can be constructed using alternative code sets. The purpose of the Communications equipment room world is for the user to learn how to complete the DSL installation process by connecting a modem to the router. The communications equipment room displays an equipment rack at which the user installs a modem and connects the appropriate cables. In this world, the user performs a series of steps to configure the DSL modem for IVPN to be able to be in place at the customer site. The user utilizes his laptop, and connects modem cables to their appropriate port. The user connects the router for the office network to the modem. After completion of the DSL installation, the user interacts with a communications specialist that is in the communications equipment room world. The user requests that the communications specialist perform any required testing.

Following completion of the communications equipment room world, the user clicks on the map icon. In the bottom right-hand corner of that map is a button called done with installation. The user clicks on this button to bring up a detailed score card and feedback evaluating the user actions during the simulation.

At step 372, while the user is in the communications equipment room world, the user may input a question via the natural language interface. At step 374, the NLI engine 114 retrieves the appropriate response from the NLI database 126 utilizing information from the context database 130. At step 376, the server system 104 presents the response to the user at the client 102. At step 378, the action event engine 118 compares user actions with a predetermined set of desired actions stored in the context database. At step 382, if the user did not perform the correct installation, the server system presents a responsive video to the user. This video may be a "war story" by a former technician describing the consequences of performing such an incorrect action. If the user connects the wrong cables, the user receives immediate feedback in the form of a video war story similar to that described in the IT room world. At step 384, the server system may present responsive text to the user.

Within the communications equipment room world, there are a number of avatars that the user can interact with. The communications specialist, located behind the desk, can be asked questions around what steps need to be taken to complete the tasks in the garage. "Where do in need to put the modem?", "Would you like me to test the service?", are examples of the types of questions the user might ask the communications specialist. In addition to the communications specialist avatar, there is a bystander avatar inside the communications equipment room world that proactively interacts with the user by posing a question about having DSL installed at their residence. This question addresses customer service interaction skills.

Inside the communications equipment room world, the user is tasked with installing and configuring the modem for the customer and testing the service to ensure that the service is properly installed. Failing to complete the above tasks, results in feedback and/or unsuccessful completion of the installation scenario. If the user does not accurately install and configure the modem, the service will not return and accurate test. If the user does not accurately test the service, the user will receive negative feedback based on the overall success of the installation.

What is claimed is:

1. A method for training a user in administering telecommunications equipment, the method comprising:
   presenting a first scenario associated with the administering of the telecommunications equipment to the user by a computer, wherein said first scenario comprises a virtual simulation of a user, a virtual simulation of the telecommunications equipment, and a virtual simulation of interaction of the user with the telecommunications equipment, and wherein the scenario further comprises a desired action;
   accepting and storing a user input submitted in response to the first scenario by said computer, wherein the user input represents a proposed action by the user to the first scenario;
   comparing the user input responsive to the first scenario with the desired action by said computer; and
   presenting a second scenario representing a predicted change to the first scenario from the user input by said computer, so as to provide training to the user in administering telecommunications equipment.

2. The method of claim 1, wherein the scenario reflects an area of of training predetermined as integral to the administration of the telecommunications equipment.

3. The method of claim 1, wherein the scenario comprises:
   a first plurality of images associated with a telecommunications technician's work location;
   a second plurality of images associated with an inside terminal room at a customer building; and
   a third plurality of images associated with a communications equipment room at a customer building.

4. The method of claim 3, further comprising a fourth plurality of images associated with a customer lobby at the customer building.

5. The method of claim 1, further comprising the computer displaying a video file responsive to the user input following the comparing the user input responsive to the scenario with the desired action.

6. The method of claim 1, further comprising the computer playing an audio file and displaying associated text to the user responsive to user input.

7. The method of claim 1, wherein the user input comprises textual information responsive to the scenario.

8. The method of claim 1, wherein the user input comprises movement data directing a movement of the virtual simulation of user.

9. The method of claim 1, wherein the user input comprises location data controlling a location of the virtual simulation of user within a scenario.

10. The method of claim 1 further comprising the step of the computer evaluating user performance, wherein the evaluating step comprises comparing the user input with the desired action.

11. The method of claim 1, wherein the step of computer presenting the first scenario comprises displaying a first area displaying a scenario and a second area displaying a textual interface box, wherein the textual interface box displays text, wherein said text is entered by the user, associated with a communication from the virtual simulation of user in a scenario, or responsive to user questions.

12. A computerized method for providing simulation training of a user in administering telecommunications equipment, the method comprising:
   providing a computer readable storage medium encoded with computer executable code for executing in a computer that corresponds to a plurality of scenarios associated with the administering of telecommunications equipment, wherein each scenario comprises computer code to represent a plurality of images to the users, said images comprising a virtual simulation of the user, a virtual simulation of the telecommunications equipment, and a virtual simulation of interaction of the user with the telecommunications equipment, and wherein said images reflect a prior user input; wherein each scenario includes computer code that accepts responsive user inputs to the plurality of images and compares the responsive user inputs with predetermined desired user inputs, and wherein each scenario further comprises computer code for comparing the responsive user inputs with the desired user inputs and presenting image representing a predicted change to the image from the user input, so as to provide simulation training to the user in administering telecommunications equipment.

13. A computer system for simulation training of a user in the administration of telecommunications equipment comprising:
   a memory means for storing a plurality images associated with the simulated administration of telecommunications equipment;

a display means for displaying to the user a plurality of scenarios associated with simulated administration of telecommunications equipment, the scenarios comprises a virtual simulation of a user, a virtual simulation of the telecommunications equipment, and a virtual simulation of interaction of the user with the telecommunications equipment;

an input means for accepting user inputs in response to the plurality of scenarios, wherein the user inputs comprise directions for actions by the virtual simulation of user to the virtual simulation of the telecommunications equipment, and action representing the performing of a series of interactions and physical tasks associated with telecommunications equipment administration;

a processor means for comparing the user inputs with the desired user inputs, wherein subsequent possible simulated interactions and simulated physical tasks presented to the user are partially dependent on the user inputs, so as to provide simulation training to the user in the administration of telecommunications equipment.

14. The system of claim 13, wherein the display means and input means are remote from the memory means and processor means.

15. A computer readable storage medium for executing in a computer to provide simulation training to a user in administration of telecommunications equipment comprising:

computer readable code for executing in a computer that corresponds to a plurality of scenarios associated with the administration of telecommunications equipment, wherein each scenario includes computer code to represent a plurality of images to the use, the images comprising a virtual simulation of a user, a virtual simulation of the telecommunications equipment, and a virtual simulation of interaction of the user with the telecommunications equipment, and wherein each scenario includes computer code that can receive responsive user inputs to the plurality of images and compares the responsive user input with predetermined desired user inputs, and computer code for updating the scenario to reflect a predicted changes to the scenarios from the user inputs, so as to provide simulation training to the user in administration telecommunications equipment.

* * * * *